(12) United States Patent
Komura et al.

(10) Patent No.: US 11,536,885 B2
(45) Date of Patent: Dec. 27, 2022

(54) DISPLAY DEVICE

(71) Applicant: Japan Display Inc., Tokyo (JP)

(72) Inventors: Shinichi Komura, Tokyo (JP); Junji Kobashi, Tokyo (JP); Koichi Okuda, Tokyo (JP); Ken Onoda, Tokyo (JP); Hiroaki Kijima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/450,479

(22) Filed: Oct. 11, 2021

(65) Prior Publication Data

US 2022/0113460 A1 Apr. 14, 2022

(30) Foreign Application Priority Data

Oct. 12, 2020 (JP) .............................. JP2020-171845

(51) Int. Cl.
| | |
|---|---|
| G02B 27/01 | (2006.01) |
| G02F 1/1335 | (2006.01) |
| G02F 1/13363 | (2006.01) |
| G02B 5/30 | (2006.01) |
| G02B 30/34 | (2020.01) |

(52) U.S. Cl.
CPC ............ *G02B 5/3016* (2013.01); *G02B 30/34* (2020.01)

(58) Field of Classification Search
None
See application file for complete search history.

(56) References Cited

U.S. PATENT DOCUMENTS

| | | | |
|---|---|---|---|
| 6,421,183 B1 | 7/2002 | Ophey | |
| 2001/0028332 A1 | 10/2001 | Roest | |
| 2018/0180889 A1 | 6/2018 | Lee et al. | |
| 2019/0079234 A1 | 3/2019 | Takagi et al. | |
| 2019/0265493 A1 | 8/2019 | Takagi et al. | |
| 2019/0265494 A1 | 8/2019 | Takagi et al. | |
| 2019/0384070 A1* | 12/2019 | Geng | G02B 5/3025 |
| 2020/0132994 A1* | 4/2020 | Niu | H01L 51/5293 |

FOREIGN PATENT DOCUMENTS

| | | |
|---|---|---|
| JP | 2003-504663 A | 2/2003 |
| JP | 2003-529795 A | 10/2003 |
| JP | 2018-106160 A | 7/2018 |
| JP | 2019-053152 A | 4/2019 |
| JP | 2019-148626 A | 9/2019 |
| JP | 2019-148627 A | 9/2019 |

\* cited by examiner

*Primary Examiner* — Phu Vu
(74) *Attorney, Agent, or Firm* — Maier & Maier, PLLC

(57) ABSTRACT

According to one embodiment, a display device includes a display panel configured to emit display light of linearly polarized light, a first semi-transparent element transmitting first circularly polarized light and reflecting second circularly polarized light, a first retardation film, a second semi-transparent element reflecting the first circularly polarized light and transmitting the second circularly polarized light, a second retardation film having a refractive anisotropy in which refractive indexes of directions orthogonal to each other in a plane are substantially equivalent to each other and a refractive index in a normal is different from a refractive index in a plane, and a first element having a lens action of condensing the second circularly polarized light.

14 Claims, 21 Drawing Sheets

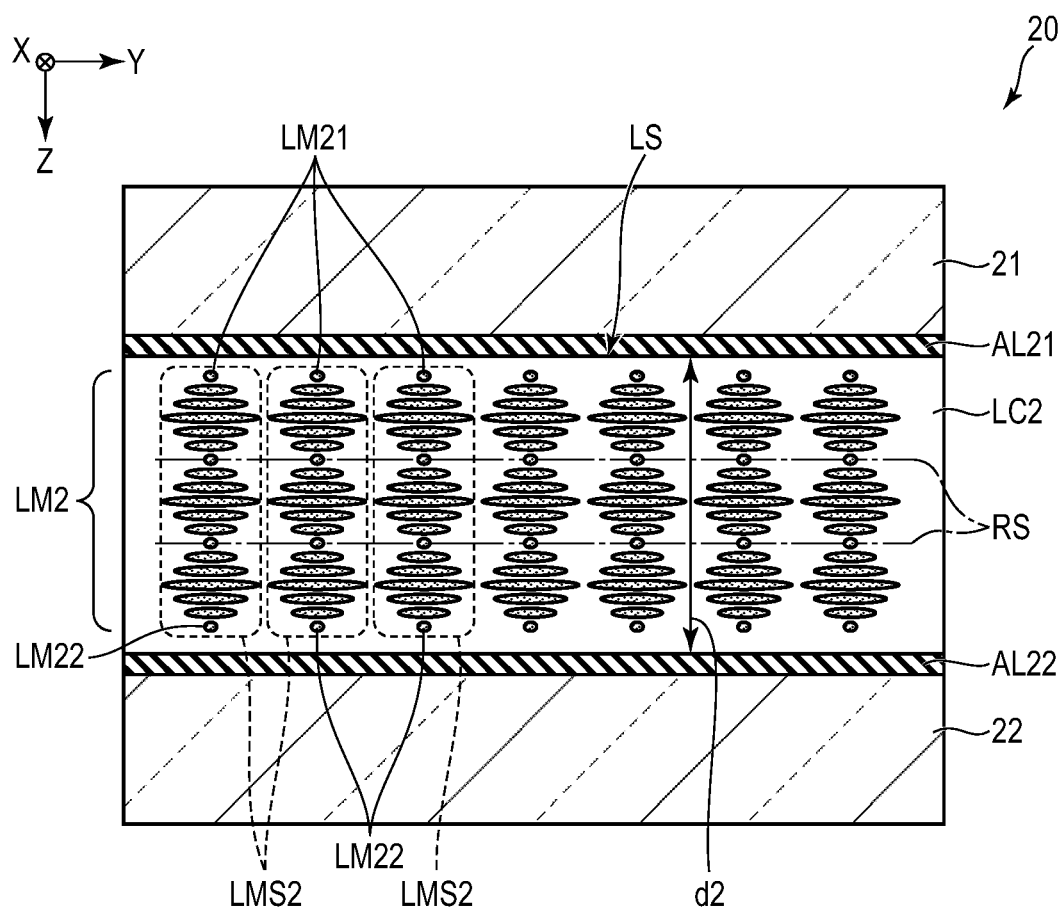
F I G. 7

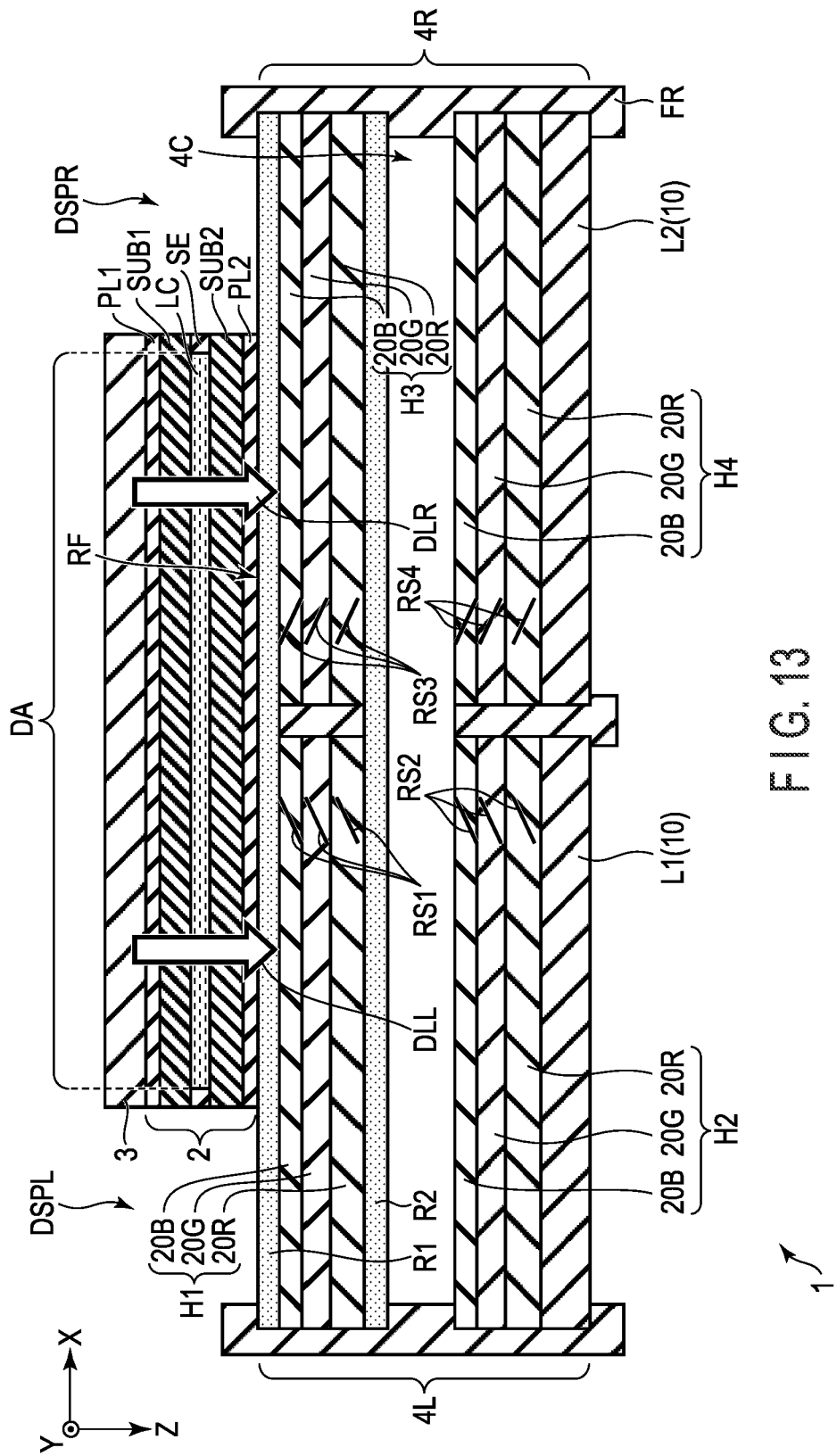
F I G. 13

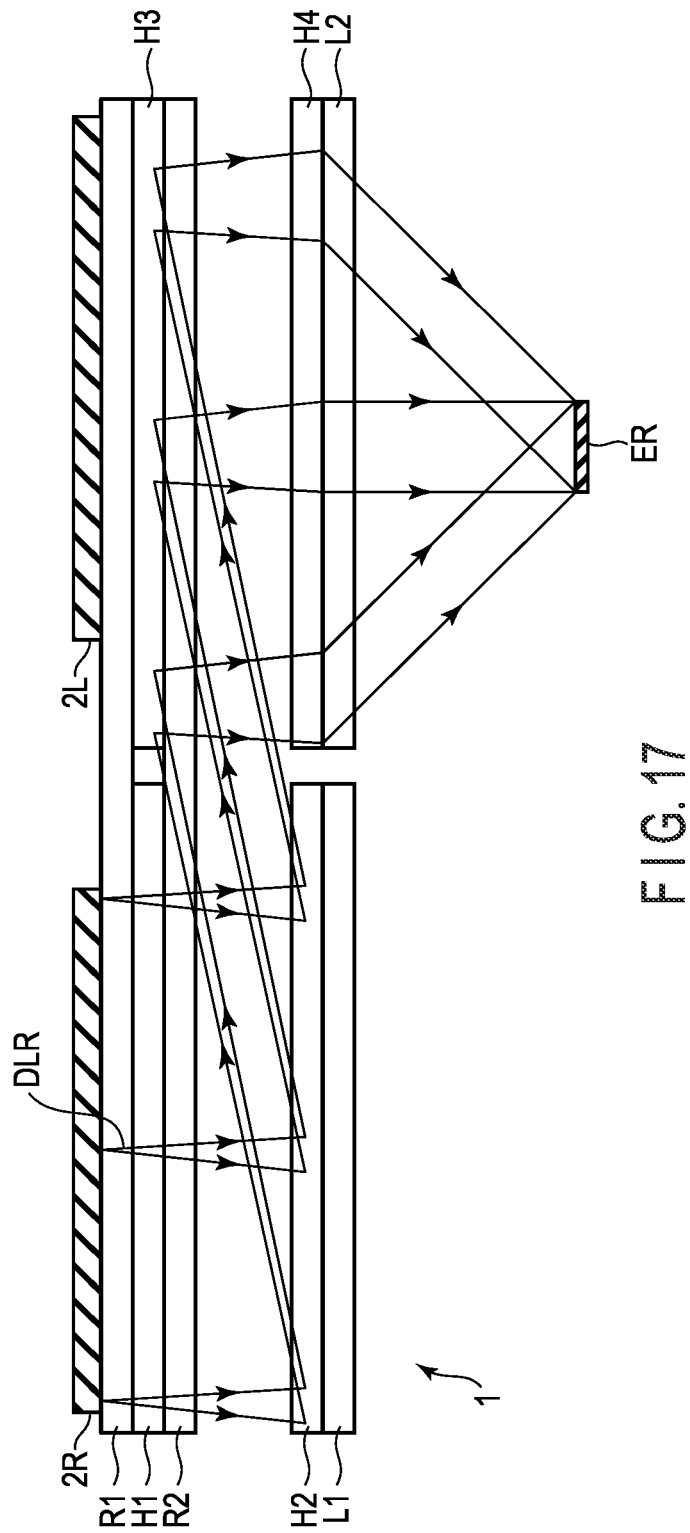
F I G. 17

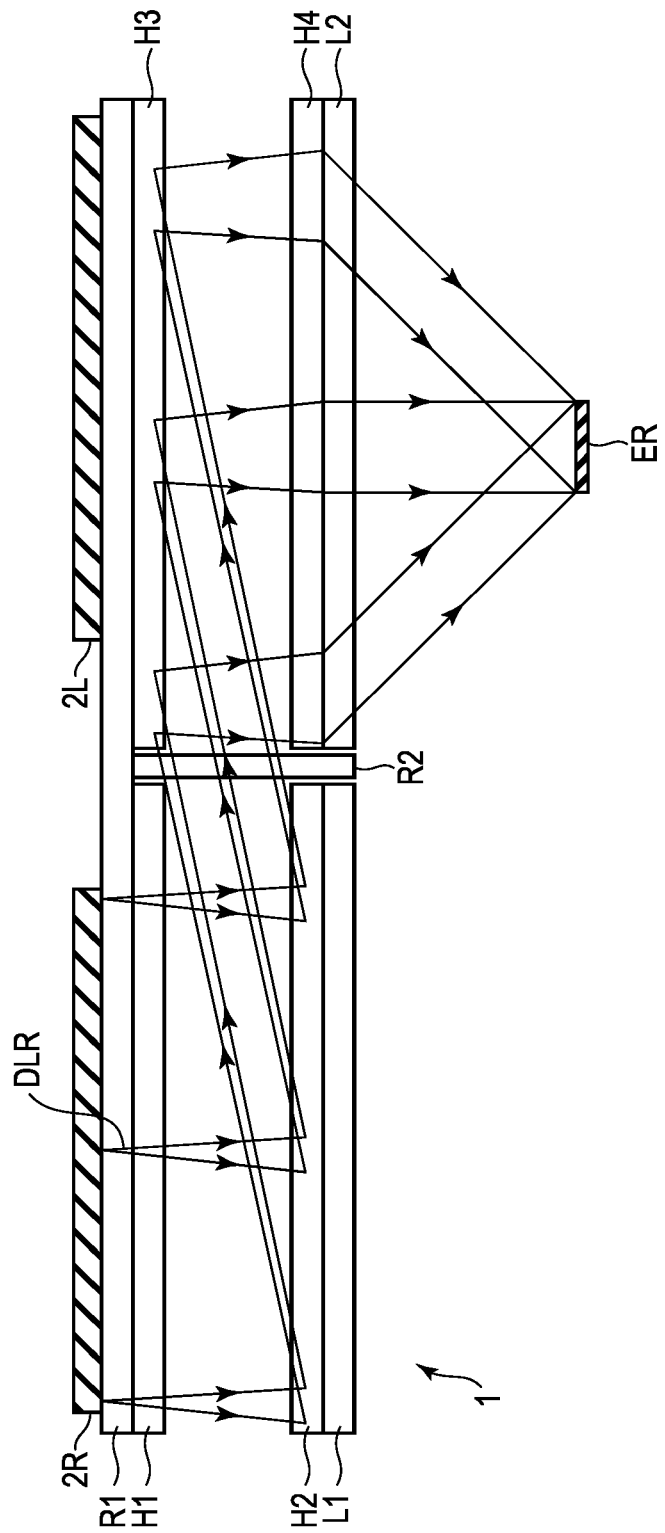
F I G. 19

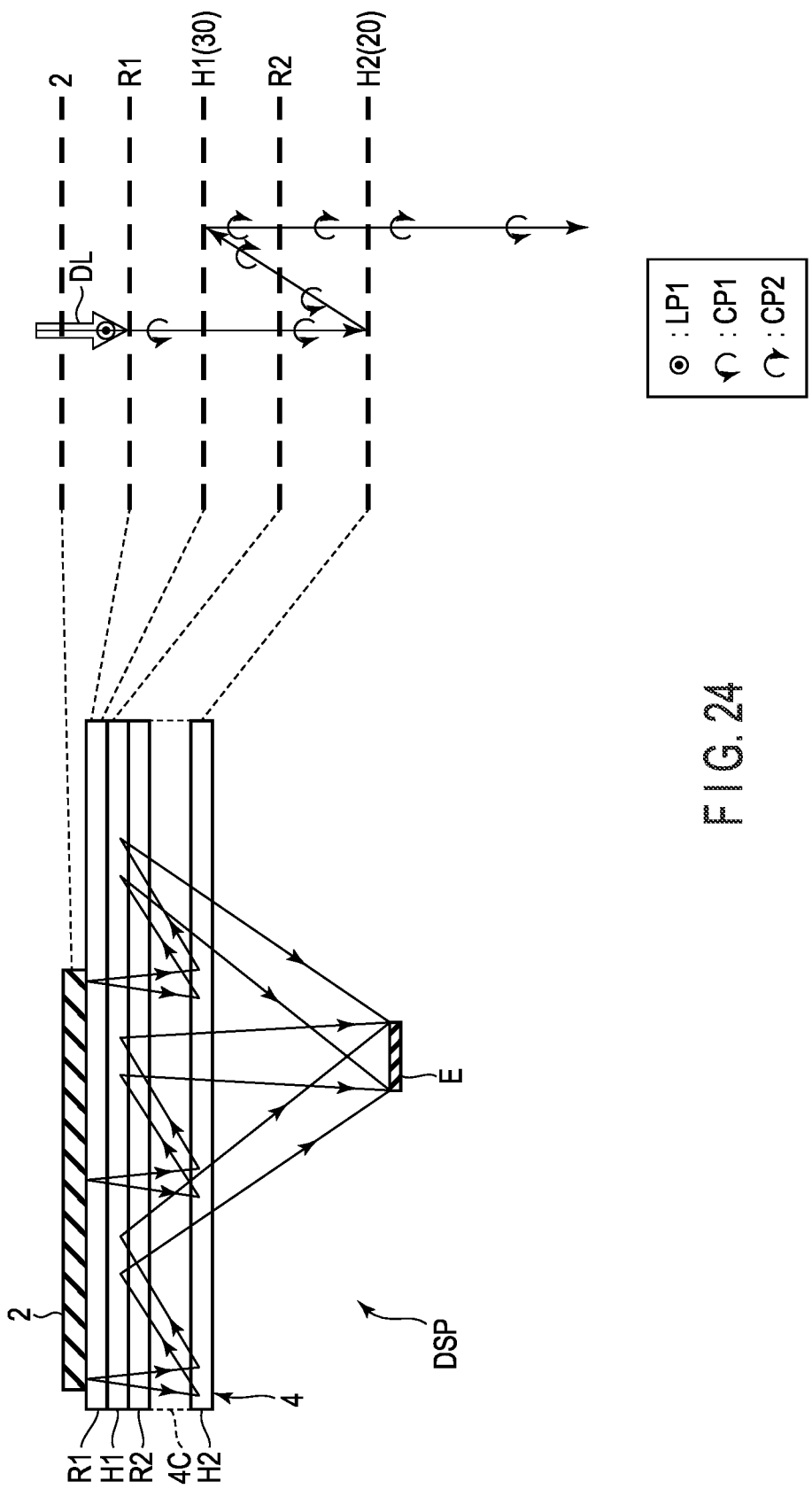
F I G. 24

DISPLAY DEVICE

CROSS-REFERENCE TO RELATED APPLICATIONS

This application is based upon and claims the benefit of priority from Japanese Patent Application No. 2020-171845, filed Oct. 12, 2020, the entire contents of which are incorporated herein by reference.

FIELD

Embodiments described herein relate generally to a display device.

BACKGROUND

In recent years, a technique of providing, for example, virtual reality (VR) using a head-mounted display mounted on a user's head has been focused. The head-mounted display is configured such that an image is displayed on a display provided in front of user's eyes. The user wearing the head-mounted display can experience virtual reality space with a sense of reality.

BRIEF DESCRIPTION OF THE DRAWINGS

FIG. 7 is a cross-sectional view showing an example of the optical element 20 shown in FIG. 3.

FIG. 13 is a cross-sectional view showing a first configuration example of a head-mounted display 1.

FIG. 17 is a view illustrating an optical action of the head-mounted display 1 shown in FIG. 16.

FIG. 19 is a view illustrating the optical action of the head-mounted display 1 shown in FIG. 18.

FIG. 24 is a view illustrating the optical action of the display device DSP shown in FIG. 22.

DETAILED DESCRIPTION

Figure 1:
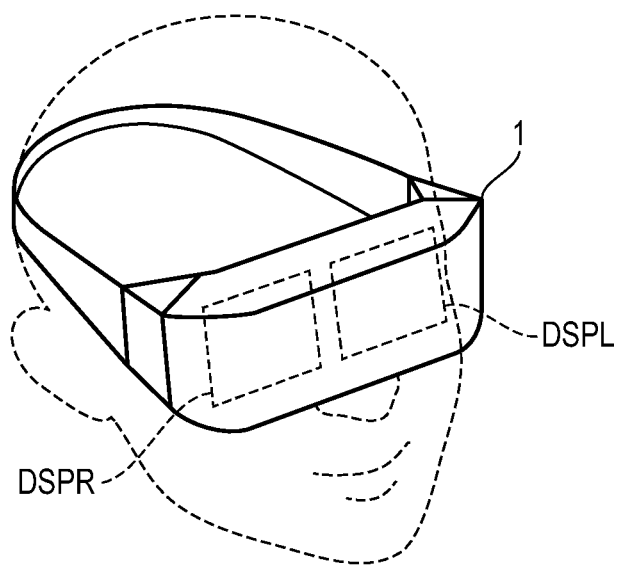
FIG. 1 is a perspective view showing an example of an appearance of a head-mounted display 1 to which a display device of the embodiments is applied.

In general, according to one embodiment, a display device comprises a display panel having a display region configured to emit display light of linearly polarized light, a first semi-transparent element transmitting first circularly polarized light and reflecting second circularly polarized light in a reverse direction to the first circularly polarized light, a first retardation film arranged between the display panel and the first semi-transparent element, a second semi-transparent element separated from the first semi-transparent element, reflecting the first circularly polarized light, and transmitting the second circularly polarized light, a second retardation film arranged between the first semi-transparent element and the second semi-transparent element, and having a refractive anisotropy in which refractive indexes of directions orthogonal to each other in a plane are substantially equivalent to each other and a refractive index in a normal is different from a refractive index in a plane, and a first element opposed to the second semi-transparent element and having a lens action of condensing the second circularly polarized light.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, an X-axis, a Y-axis and a Z-axis orthogonal to each other are described in the drawings to facilitate understanding as needed. A direction along the X-axis is referred to as a first direction X, a direction along the Y-axis is referred to as a second direction Y, and a direction along the Z-axis is referred to as a third direction Z. A plane defined by the X-axis and the Y-axis is referred to as an X-Y plane and viewing the X-Y plane is referred to as planar view.

FIG. 1 is a perspective view showing an example of an appearance of a head-mounted display 1 to which a display device of the embodiments is applied. The head-mounted display 1 comprises, for example, a display device DSPR for a right eye and a display device DSPL for a left eye. In a state in which the user wears the head-mounted display 1 on the head, the display device DSPR is arranged to be located in front of the user's right eye, and the display device DSPL is arranged to be located in front of the user's left eye.

Figure 2:
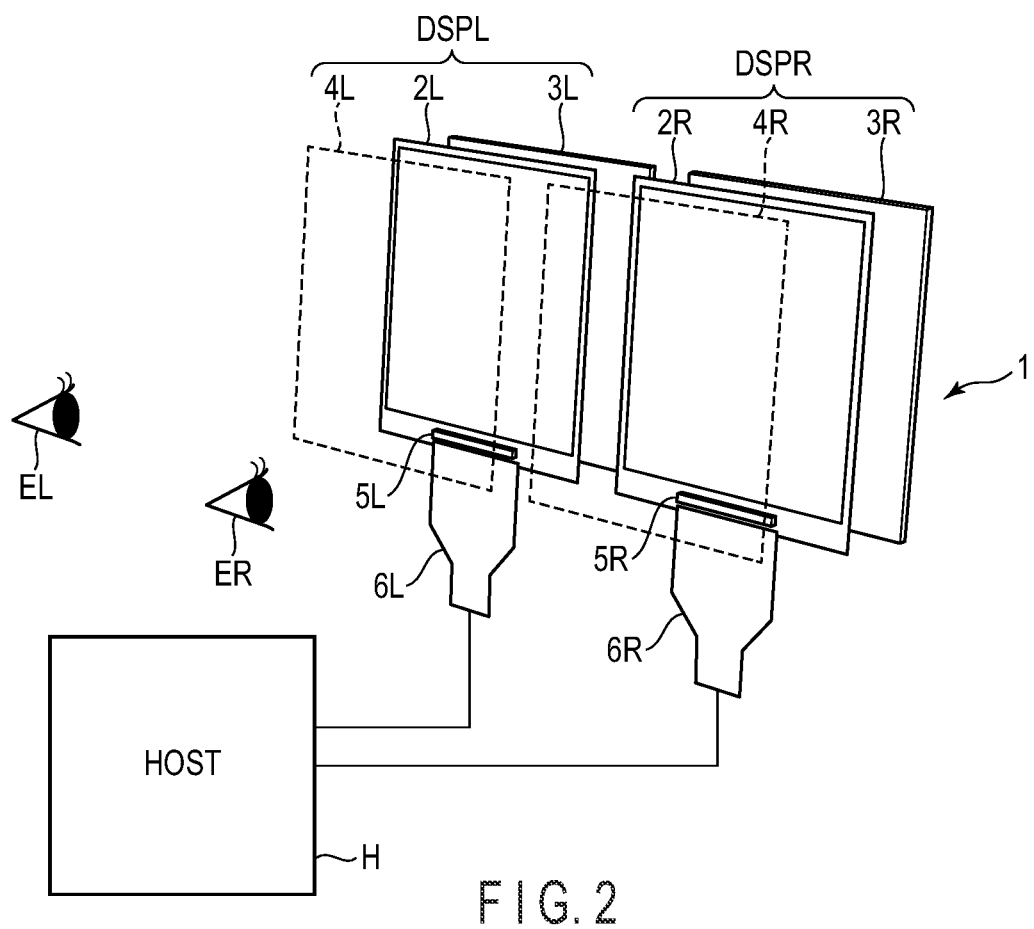
FIG. 2 is a diagram illustrating a summary of a configuration of the head-mounted display 1 shown in FIG. 1.

FIG. 2 is a diagram illustrating a summary of a configuration of the head-mounted display 1 shown in FIG. 1. The display device DSPR is configured substantially similarly to the display device DSPL.

The display device DSPR comprises a display panel 2R, an illumination device 3R, and an optical system 4R represented by a dotted line. The illumination device 3R is arranged on a back surface of the display panel 2R and configured to illuminate the display panel 2R. The optical system 4R is arranged in front of the display panel 2R (or between the user's right eye ER and the display panel 2R) and configured to guide display light from the display panel 2R to the right eye ER.

The display panel 2R is, for example, a liquid crystal panel. The display panel 2R is arranged between the illumination device 3R and the optical system 4R. For example, a driver IC chip 5R and a flexible printed circuit board 6R are connected to the display panel 2R. The driver IC chip 5R controls drive of the display panel 2R (particularly, controls a display action of the display panel 2R).

The display device DSPL comprises a display panel 2L, an illumination device 3L, and an optical system 4L represented by a dotted line. The illumination device 3L is arranged on a back surface of the display panel 2L and configured to illuminate the display panel 2L. The optical system 4L is arranged in front of the display panel 2L (or between the user's left eye EL and the display panel 2L) and configured to guide display light from the display panel 2L to the left eye EL.

The display panel 2L is, for example, a liquid crystal panel. The display panel 2L is arranged between the illumination device 3L and the optical system 4L. For example, a driver IC chip 5L and a flexible printed circuit board 6L are connected to the display panel 2L. The driver IC chip 5L controls drive of the display panel 2L (particularly, controls a display action of the display panel 2L).

The display panel 2R, the illumination device 3R, and the optical system 4R configuring the display device DSPR are configured similarly to the display panel 2L, the illumination device 3L, and the optical system 4L configuring the display device DSPL.

In the display device DSP according to the embodiments, the display panels 2R and 2L are not limited to liquid crystal panels, but may be display panels comprising self-luminous light emitting elements such as organic electroluminescent (EL) devices, micro-LED, and mini-LED. When the display panel is a display panel comprising the light emitting elements, the illumination devices 3R and 3L are omitted.

A host computer H provided outside is connected to each of the display panels 2L and 2R. The host computer H outputs image data corresponding to the images displayed on the display panels 2L and 2R. The image displayed on the display panel 2L is an image for the left eye (or an image to be visually recognized by the user's left eye EL). In addition, the image displayed on the display panel 2R is an image for the right eye (or an image to be visually recognized by the user's right eye ER).

For example, when the head-mounted display 1 is used for VR, the image for the left eye and the image for the right eye are images similar to each other, which reproduce the parallax of both eyes. When the image for the left eye displayed on the display panel 2L is visually recognized by the user's left eye EL and the image for the right eye displayed on the display panel 2R is visually recognized by the user's right eye ER, the user can grasp a stereoscopic space (three-dimensional space) as a virtual reality space.

The display panels 2R and 2L may be configured as a single display panel extending in front of the left eye EL and the right eye ER. Alternatively, the illumination devices 3R and 3L may be configured as a single illumination device extending in front of the left eye EL and the right eye ER.

Next, a first configuration example of the display device DSP according to the embodiments will be described.

First Configuration Example

Figure 3:
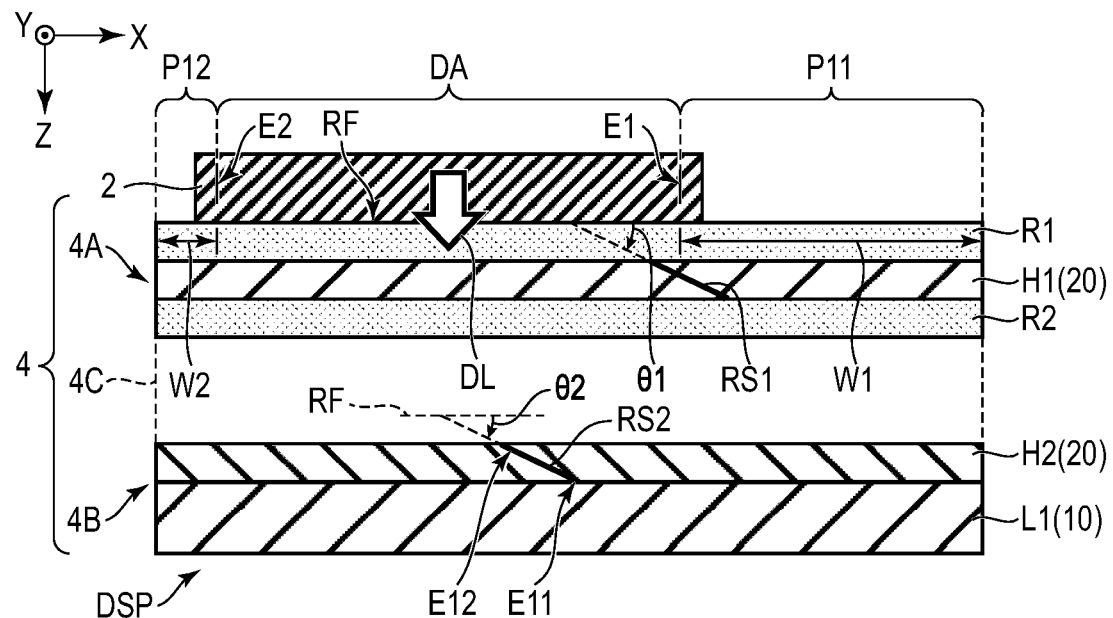
FIG. 3 is a cross-sectional view showing a first configuration example of the display device DSP.

FIG. 3 is a cross-sectional view showing a first configuration example of the display device DSP.

The display device DSP comprises a display panel 2 and an optical system 4. Illustration of the details of the display panel 2 is omitted and illustration of the illumination devices is also omitted. The display device DSP described herein can be applied to each of the display devices DSPR and DSPL. In addition, the display panel 2 can be applied to each of the display panels 2R and 2L. In addition, the optical system 4 can be applied to each of the optical systems 4R and 4L.

The display panel 2 is formed in a flat plate extending over the X-Y plane. Details of the display panel 2 will be described later, but is configured to emit display light DL of linearly polarized light in the display region DA. For example, the display panel 2 comprises a polarizer, and the display light DL of the linearly polarized light is emitted via the polarizer.

The display panel 2 is not limited to a liquid crystal panel in not only the first configuration example, but also the other configuration examples. When the display panel 2 is a display panel comprising a self-luminous light emitting element, the illumination device 3 is omitted as described above. In addition, in this case, the display light DL emitted from the light emitting element is transmitted through the polarizer and converted into the display light DL of the linearly polarized light.

The optical system 4 comprises a first structure 4A and a second structure 4B. The first structure 4A is separated from the second structure 4B. In the example shown in FIG. 3, an air layer 4C is provided between the first structure 4A and the second structure 4B. The first structure 4A is arranged between the display panel 2 and the second structure 4B (or between the display panel 2 and the air layer 4C).

The first structure 4A comprises a first retardation film R1, a first semi-transparent element H1, and a second retardation film R2. The first retardation film R1 is a quarter-wave plate, assigning a quarter-wave phase difference to transmitted light.

The first semi-transparent element H1 comprises an optical element 20 including cholesteric liquid crystal, which will be described later in detail. The optical element 20 transmits first circularly polarized light, of light of specific wavelengths, and reflects second circularly polarized light reverse with the first circularly polarized light toward the second structure 4B. The optical element 20 has a reflective plane RS1 which is simplified in the drawing. When a boundary between the display panel 2 and the first retardation film R1 (or a plane parallel to the X-Y plane) is referred to as a reference plane RF, an angle θ1 formed between the reflective plane RS1 and the reference plane RF is an acute angle clockwise from the reference plane RF.

The second retardation film R2 has a refractive anisotropy equivalent to the C plate. That is, when refraction indexes in directions orthogonal to each other in the plane (X-Y plane) of the second retardation film R2 are referred to as nx and ny, respectively, and when a refractive index in the normal or the thickness direction (third direction Z) of the second retardation film R2 is referred to as nz, the refractive index nx is substantially the same as the refractive index ny, and the refractive index nz is different from the refractive index nx in the plane (nx=ny≠nz). In other words, the planar phase difference of the second retardation film R2 is approximately zero. The refractive anisotropy of the second retardation film R2 may be negative as represented by nx=ny>nz or may be positive as represented by nx=ny<nz. Such a second retardation film R2 does not assign the phase difference to the light passing through an optical path along the normal, but assigns the half-wave phase difference to light passing through an optical path in a direction oblique to the normal.

The first retardation film R1, the first semi-transparent element H1, and the second retardation film R2 extend in a range wider than the display region DA in the X-Y plane. However, the first retardation film R1 may cover at least the display region DA. In addition, the first retardation film R1, the first semi-transparent element H1, and the second retardation film R2 are stacked in this order along the third direction Z. The first retardation film R1 is in contact with the display panel 2, the first semi-transparent element H1 is in contact with the first retardation film R1, and the second retardation film R2 is in contact with the first semi-transparent element H1. The first retardation film R1 is arranged between the display panel 2 and the first semi-transparent element H1. The first semi-transparent element H1 is located between the first retardation film R1 and the second retardation film R2.

The second structure 4B comprises a second semi-transparent element H2 and a first element L1.

The second semi-transparent element H2 comprises an optical element 20 having cholesteric liquid crystal, which will be described later. The optical element 20 transmits second circularly polarized light of the light of specific wavelengths and reflects first circularly polarized light to the first structure 4A. The optical element 20 has a reflective plane RS2, which is simply shown in the drawing. When a boundary between the display panel 2 and the first retardation film R1 (or a plane parallel to the X-Y plane) is referred to as a reference plane RF, an angle θ2 formed between the reflective plane RS2 and the reference plane RF is an acute angle clockwise from the reference plane RF.

The first element L1 comprises a liquid crystal element 10, which will be described later. The liquid crystal element 10 assigns a half-wave phase difference to the light of the specific wavelength and has a lens action of condensing the second circularly polarized light. The liquid crystal element 10 is mentioned as an example of the device having a lens action of condensing the circularly polarized light, but the element is not limited to a device using the liquid crystal if it has an equivalent lens action.

The second semi-transparent element H2 and the first element L1 extend in a range wider than the display region DA on the X-Y plane. In addition, the second semi-transparent element H2 and first element L1 are stacked along the third direction Z. The first element L1 is in contact with the second semi-transparent element H2. The second semi-transparent element H2 is separated from the first semi-transparent device H1 and the second retardation film R2, and is opposed to the second retardation film R2 through the air layer 4C in the third direction Z. The first semi-transparent element H1 and the second semi-transparent element H2 are spaced apart and opposed in the third direction Z, and the second retardation film R2 and the air layer 4C are interposed therebetween. The second retardation film R2 is arranged between the first semi-transparent element H1 and the second semi-transparent element H2. The first element L1 is opposed to the second semi-transparent element H2.

The display region DA has a first end portion E1 and a second end portion E2 on a side opposite to the first end portion E1. The first semi-transparent element H1, the second retardation film R2, the second semi-transparent element H2, and the first element L1 have a first part P11 extending outward from the first end portion E1, and a second part P12 extending outward from the second end portion E2. In the example shown in FIG. 3, the first part P11 and the second part P12 extend along the first direction X. A width W1 of the first part P11 along the first direction X is larger than a width W2 of the second part P12 along the first direction X (W1>W2).

In FIG. 3, the first part P11 is located on the right side with respect to the display region DA, and the second part P12 is located on the left side with respect to the display region DA. The reflective plane RS2 of the second semi-transparent element H2 has an end portion E11 on the right side (the side where the first part P11 is located) in the drawing, and an end portion E12 on the left side (the side where the second part is located) in the drawing. The reflective plane RS2 is inclined such that the end portion E11 is located on a side separated from the display panel 2 and the end portion E12 is located on a side close to the display panel 2.

The display panel 2 and the first retardation film R1 are desirably in close contact with each other with no air layer interposed therebetween. In addition, the first retardation film R1, the first semi-transparent element H1, and the second retardation film R2 constructing the first structure 4A are desirably in close contact with one another with no air layer interposed between. Furthermore, the second semi-transparent element H2 and the first element L1 constructing the second structure 4B are desirably in close contact with each other with no air layer interposed between. Undesired reflection or refraction in the interface between the members can be thereby inhibited.

For example, the first retardation film R1 assigns a quarter-wave phase difference to at least light of the green wavelength, but is not limited to this. For example, as the first retardation film R1, a wide-band type retardation film that also assigns an approximately quarter-wave phase difference to the light of each of the red wavelength, the green wavelength and the blue wavelength can be applied. As such a wide-band type retardation film, for example, a retardation film formed by bonding a quarter-wave plate and a half-wave plate in a state in which a slow axis of the quarter-wave plate and a slow axis of the half-wave plate forms a predetermined angle can be applied. Wavelength dependency in the first retardation film R1 can be thereby relaxed.

Figure 4:
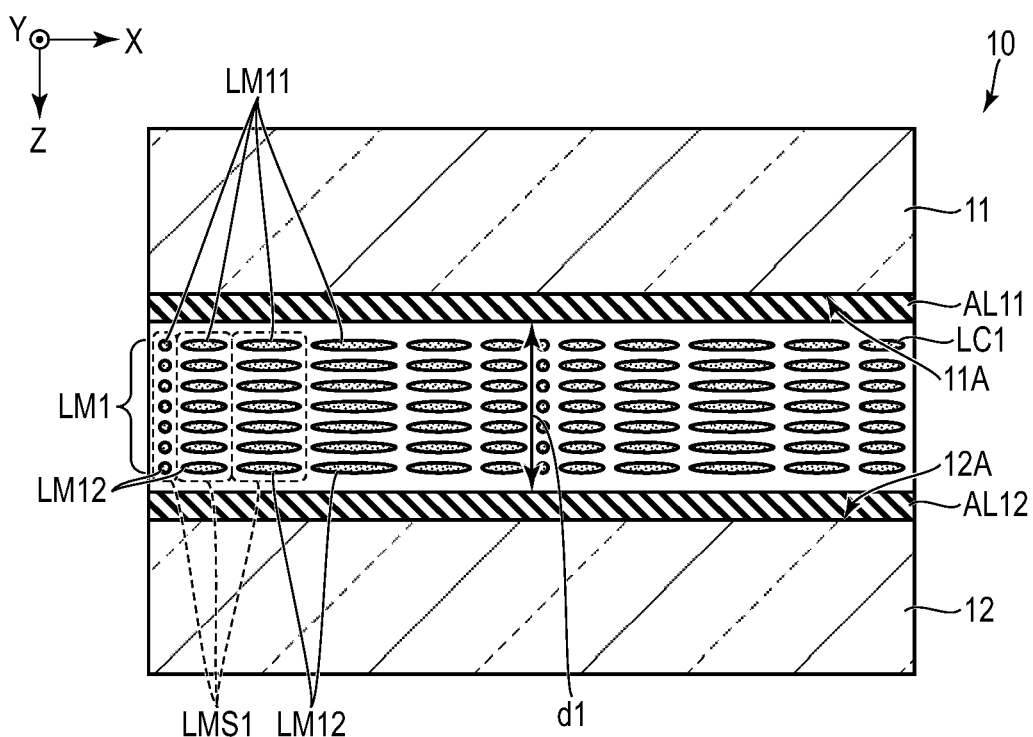
FIG. 4 is a cross-sectional view showing an example of a liquid crystal element 10 shown in FIG. 3.

FIG. 4 is a cross-sectional view showing an example of a liquid crystal element 10 shown in FIG. 3. The liquid crystal element 10 comprises a substrate 11, an alignment film AL11, a liquid crystal layer (first liquid crystal layer) LC1, an alignment film AL12, and a substrate 12. The substrates 11 and 12 are transparent substrates that transmit light and are composed of, for example, transparent glass plates or transparent synthetic resin plates.

The alignment film AL11 is arranged on an inner surface 11A of the substrate 11. In the example shown in FIG. 4, the alignment film AL11 is in contact with the substrate 11, but the other thin film may be interposed between the alignment film AL11 and the substrate 11.

The alignment film AL12 is arranged on an inner surface 12A of the substrate 12. In the example shown in FIG. 4, the alignment film AL12 is in contact with the substrate 12, but the other thin film may be interposed between the alignment film AL12 and the substrate 12. The alignment film AL12 is opposed to the alignment film AL11 in the third direction Z.

Each of the alignment films AL11 and AL12 is, for example, a horizontal alignment film which is formed of polyimide and which has an alignment restriction force along the X-Y plane.

The liquid crystal layer LC1 is arranged between the alignment films AL11 and AL12 and is in contact with the alignment films AL11 and AL12. The liquid crystal layer LC1 has a thickness d1 along the third direction Z. The liquid crystal layer LC1 has the nematic liquid crystal which has the alignment direction aligned with the third direction Z.

That is, the liquid crystal layer LC1 includes a plurality of liquid crystal structures LMS1. When one liquid crystal structure LMS1 is focused, the liquid crystal structure LMS1 contains liquid crystal molecules LM11 located on one end side and liquid crystal molecules LM12 on the other end side. The liquid crystal molecules LM11 are close to the alignment film AL11, and the liquid crystal molecules LM12 are close to the alignment film AL12. The alignment direction of the liquid crystal molecules LM11 is substantially coincident with the alignment direction of the liquid crystal molecules LM12. In addition, the alignment direction of the other liquid crystal molecules LM1 between the liquid crystal molecules LM11 and the liquid crystal molecules LM12 is also substantially coincident with the alignment direction of the liquid crystal molecules LM11. The alignment direction of the liquid crystal molecules LM1 corresponds to the longer axes of the liquid crystal molecules in the X-Y plane.

In addition, in the liquid crystal layer LC1, a plurality of liquid crystal structures LMS1 adjacent in the first direction X have alignment directions different from each other. Similarly, a plurality of liquid crystal structures LMS1 adjacent in the second direction Y have alignment directions different from each other. The alignment directions of the plurality of liquid crystal molecules LM11 arranged along the alignment film AL11 and the alignment directions of the plurality of liquid crystal molecules LM12 arranged along the alignment film AL12 are changed continuously (or linearly).

Such a liquid crystal layer LC1 is cured in a state in which the alignment direction of the liquid crystal molecules LM1 containing the liquid crystal molecules LM11 and the liquid crystal molecules LM12 is fixed. In other words, the alignment direction of the liquid crystal molecules LM1 is not controlled depending on the electric field. For this reason, the liquid crystal element 10 does not comprise an electrode for controlling the alignment.

When the refractive anisotropy or birefringence (difference between a refractive index ne to extraordinary light and a refractive index no to ordinary light in the liquid crystal layer LC1) of the liquid crystal layer LC1 is referred to as $\Delta n$, retardation (phase difference) $\Delta n \cdot d1$ of the liquid crystal layer LC1 is set to ½ of the specific wavelength $\lambda$.

Figure 5:
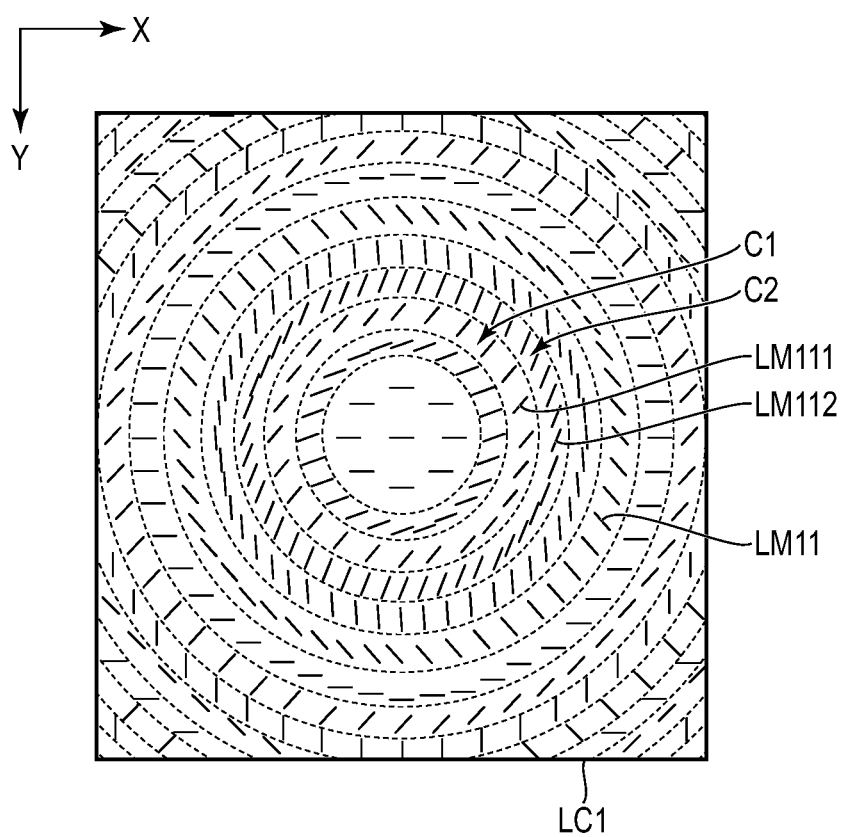
FIG. 5 is a plan view showing an example of an alignment pattern in a liquid crystal layer LC1 shown in FIG. 4.

FIG. 5 is a plan view showing an example of an alignment pattern in a liquid crystal layer LC1 shown in FIG. 4. An example of the spacial phase in the X-Y plane of liquid crystal layer LC1 is shown in FIG. 5. The spacial phase shown herein is shown as the alignment direction of the liquid crystal molecules LM11 close to the alignment film AL11, of the liquid crystal molecules LM1 contained in the liquid crystal structure LMS1.

Spatial phases are aligned in concentric circles represented by dotted lines in the drawing. Alternatively, the alignment directions of the liquid crystal molecules LM11 are aligned in an annular region surrounded by two adjacent concentric circles. However, the alignment directions of the liquid crystal molecules LM11 in the adjacent annular regions are different from each other.

For example, the liquid crystal layer LC1 includes a first annular region C1 and a second annular region C2 in planar view. The second annular region C2 is located outside the first annular region C1. The first annular region C1 is constructed by a plurality of first liquid crystal molecules LM111 aligned in the same direction. In addition, the second annular region C2 is constructed by a plurality of second liquid crystal molecules LM112 aligned in the same direction. The alignment direction of the first liquid crystal molecules LM111 is different from the alignment direction of the second liquid crystal molecules LM112.

Similarly, the alignment directions of the liquid crystal molecules LM11 arranged in a radial direction from the central region of the concentric circles are different from each other and are varied continually. In other words, spatial phases of the liquid crystal layer LC1 are different in the radial direction and are varied continuously in the X-Y plane shown in the drawing.

When the second circularly polarized light of the specific wavelength $\lambda$ is made incident on the liquid crystal element 10 thus configured, the second circularly polarized light is condensed towards the center of the concentric circles, and the transmitted light of the liquid crystal element 10 is converted into the first circularly polarized light of the opposite direction to the second circularly polarized light.

Figure 6:
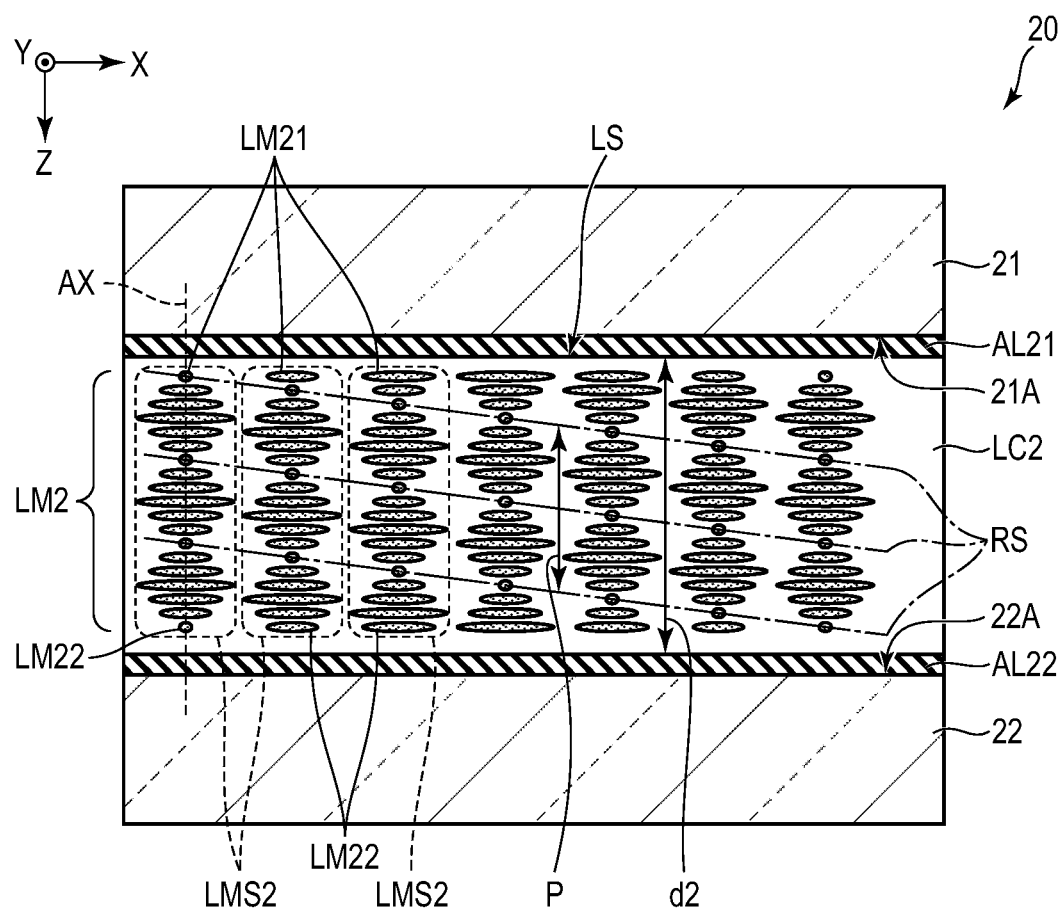
FIG. 6 is a cross-sectional view showing an example of an optical element 20 shown in FIG. 3.

FIG. 6 and FIG. 7 are cross-sectional views showing an example of the optical element 20 shown in FIG. 3. FIG. 6 shows an X-Z section defined by the first direction X and the third direction Z, and FIG. 7 shows a Y-Z section defined by the second direction Y and the third direction Z. The optical element 20 will be described below by mainly referring to FIG. 6.

The optical element 20 comprises a substrate 21, an alignment film AL21, a liquid crystal layer (second liquid crystal layer) LC2, an alignment film AL22, and a substrate 22. The substrates 21 and 22 are transparent substrates that transmit light and are composed of, for example, transparent glass plates or transparent synthetic resin plates.

The alignment film AL21 is arranged on an inner surface 21A of the substrate 21. In the example shown in FIG. 6, the alignment film AL21 is in contact with the substrate 21, but the other thin film may be interposed between the alignment film AL21 and the substrate 21.

The alignment film AL22 is arranged on an inner surface 22A of the substrate 22. In the example shown in FIG. 6, the alignment film AL22 is in contact with the substrate 22, but the other thin film may be interposed between the alignment film AL22 and the substrate 22. The alignment film AL22 is opposed to the alignment film AL2l in the third direction Z.

Each of the alignment films AL21 and AL22 is, for example, a horizontal alignment film which is formed of polyimide and which has an alignment restriction force along the X-Y plane.

The liquid crystal layer LC2 is arranged between the alignment films AL21 and AL22 and is in contact with the alignment films AL2l and AL22. The liquid crystal layer LC2 has a thickness d2 along the third direction Z. The liquid crystal layer LC2 contains cholesteric liquid crystal.

To simplify the illustration, in FIG. 6, one liquid crystal molecule LM2 represents a liquid crystal molecule facing in the average alignment direction, of the plurality of liquid crystal molecules located in the X-Y plane.

That is, the liquid crystal layer LC2 includes a plurality of liquid crystal structures LMS2. When one liquid crystal structure LMS2 is focused, the liquid crystal structure LMS2 contains liquid crystal molecules LM21 located on one end side and liquid crystal molecules LM22 on the other end side. The liquid crystal molecules LM21 are close to the alignment film AL21, and the liquid crystal molecules LM22 are close to the alignment film AL22. The plurality of liquid crystal molecules LM2 containing the liquid crystal molecule LM21 and the liquid crystal molecule LM22 are stacked along the third direction Z in a spiral state while turning to construct the cholesteric liquid crystal. In other words, the liquid crystal structure LMS2 corresponds to the cholesteric liquid crystal. The liquid crystal structure LMS2 has a helical pitch P. The helical pitch P indicates one period (360 degrees) of the spiral. For example, the thickness d2 of the liquid crystal layer LC2 is several times or more as large as the helical pitch P. A helical axis AX of the liquid crystal structure LMS2 is parallel to the normal of the liquid crystal layer LC2, i.e., the third direction Z.

In addition, as shown in FIG. 6, a plurality of liquid crystal structures LMS2 adjacent in the first direction X have alignment directions different from each other, in the liquid crystal layer LC2. The alignment directions of the plurality of liquid crystal molecules LM21 arranged along the alignment film AL21 and the alignment directions of the plurality of liquid crystal molecules LM22 arranged along the alignment film AL22 are changed continuously.

In addition, as shown in FIG. 7, a plurality of liquid crystal structures LMS2 adjacent in the second direction Y have alignment directions aligned to each other, in the liquid crystal layer LC2. That is, the alignment directions of the plurality of liquid crystal molecules LM21 arranged along the alignment film AL21 are substantially coincident with each other, and the alignment directions of the plurality of liquid crystal molecules LM22 arranged along the alignment film AL22 are substantially coincident with each other.

The liquid crystal layer LC2 has a plurality of reflective planes RS as represented by one-dot chain lines, between the alignment film AL21 and the alignment film AL22. The plurality of reflective planes RS are approximately parallel to each other. The reflective planes RS reflect a part of the circularly polarized light of the incident light and transmit the other part of the circularly polarized light according to the Bragg's law. The reflective planes RS correspond to planes where alignment directions of the liquid crystal molecules LM2 are aligned or planes (equiphase wave surfaces) where the spatial planes are aligned.

In the X-Z section shown in FIG. 6, the reflective planes RS are inclined to a main surface LS of the liquid crystal layer LC2. For example, the main surface LS is a boundary between the liquid crystal layer LC2 and the alignment film AL21, the plane parallel to the reference plane RF shown in FIG. 3, or the plane parallel to the X-Y plane.

In addition, in the Y-Z section shown in FIG. 7, the reflective planes RS are parallel to the main surface LS of the liquid crystal layer LC2. In other words, each of the plurality of reflective planes RS has an approximately planar shape extending in a certain direction, as shown in FIG. 6 and FIG. 7.

The liquid crystal structure LMS2 reflects the circularly polarized light of the same turning direction as the turning direction of the cholesteric liquid crystal of the light of the specific wavelength $\lambda$. For example, when the turning direction of the cholesteric liquid crystal is right-handed, the liquid crystal structure LMS2 reflects the right-handed circularly polarized light of the light of the specific wavelength $\lambda$ and transmits the left-handed circularly polarized light. Similarly, when the turning direction of the cholesteric liquid crystal is left-handed, the liquid crystal structure LMS2 reflects the left-handed circularly polarized light of the light of the specific wavelength $\lambda$ and transmits the right-handed circularly polarized light.

Such a liquid crystal layer LC2 is cured in a state in which the alignment direction of the liquid crystal molecules LM2 containing the liquid crystal molecules LM2$l$ and the liquid crystal molecules LM22 is fixed. In other words, the alignment direction of the liquid crystal molecules LM2 is not controlled depending on the electric field. For this reason, the optical element 20 does not comprise an electrode for controlling the alignment.

In general, a selective reflection band $\Delta\lambda$ of the cholesteric liquid crystal to the perpendicularly incident light is referred to as "no*P to ne*P", based on a helical pitch P of the cholesteric liquid crystal, a refractive index ne to extraordinary light, and refractive index no to ordinary light. For this reason, to reflect the circularly polarized light of the specific wavelength $\lambda$ on the reflective planes RS, the helical pitch P, the refractive and the indexes ne and no are set such that the specific wavelength $\lambda$ is included in the selective reflection wavelength band $\Delta\lambda$.

Each of the optical element 20 of the first semi-transparent element H1 and the optical element 20 of the second semi-transparent element H2 shown in FIG. 3 includes the liquid crystal layer LC2 including the liquid crystal structure LMS2 corresponding to the cholesteric liquid crystal shown in FIG. 6. Each of the reflective plane RS1 of the first semi-transparent element H1 and the reflective plane RS2 of the second semi-transparent element H2 shown in FIG. 3 corresponds to the reflective plane RS shown in FIG. 6 and is inclined to the main surface LS of the liquid crystal layer LC2.

In the first semi-transparent element H1 and the second semi-transparent element H2, their liquid crystal structures (cholesteric liquid crystals) LMS2 have an equal helical pitch to reflect the circularly polarized light of the same wavelength. In addition, in the first semi-transparent element H1 and the second semi-transparent element H2, their liquid crystal structures (cholesteric liquid crystals) LMS2 are turned in mutually reverse directions to reflect the second circularly polarized light on the first semi-transparent element H1 and to reflect the first circularly polarized light on the second semi-transparent element H2.

Figure 8:
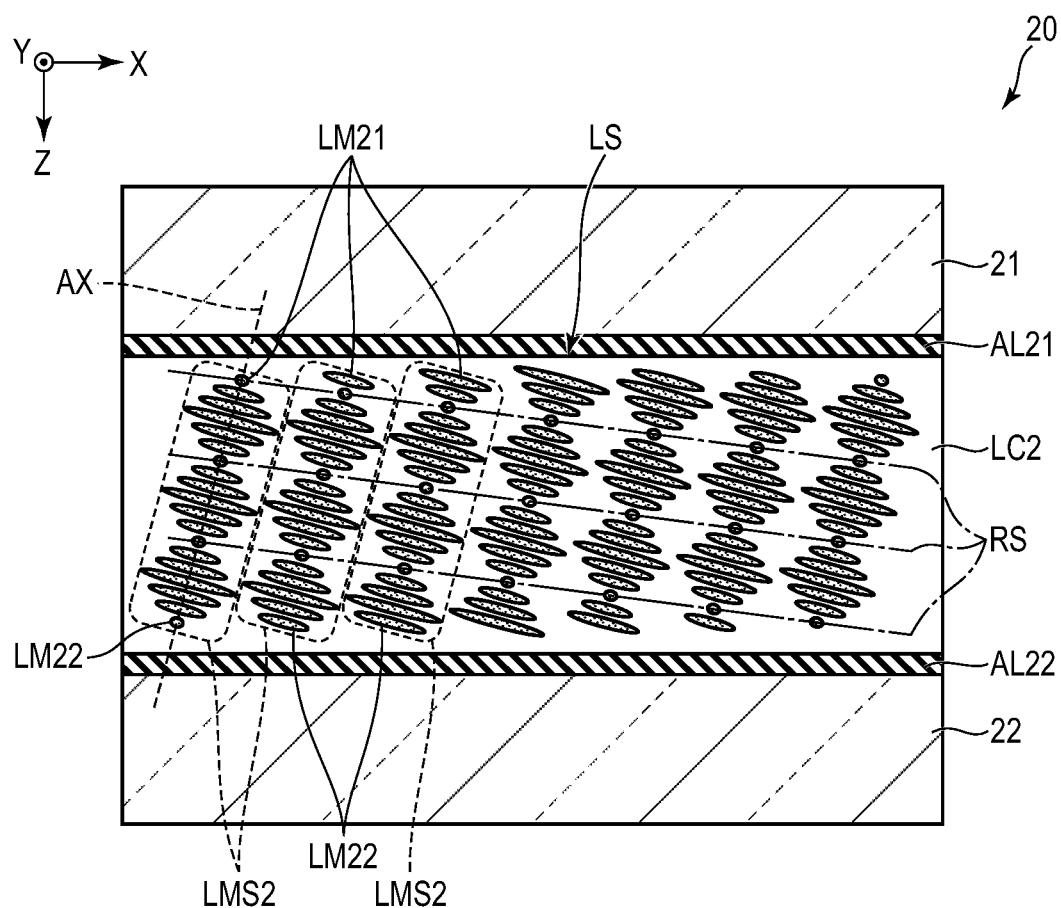
FIG. 8 is a cross-sectional view showing a modified example of the optical element 20 shown in FIG. 3.

FIG. 8 is a cross-sectional view showing a modified example of the optical element 20 shown in FIG. 3. FIG. 8 shows the X-Z section. The modified example shown in FIG. 8 is different from the example shown in FIG. 6 and the like in that the helical axes AX of the liquid crystal structures LMS2 are inclined to the normal (third direction Z) of liquid crystal layer LC2.

In the liquid crystal layer LC2, a plurality of liquid crystal structures LMS2 adjacent in the first direction X have alignment directions different from each other. The alignment directions of the plurality of liquid crystal molecules LM21 arranged along the alignment film AL21 and the alignment directions of the plurality of liquid crystal molecules LM22 arranged along the alignment film AL22 are changed continuously.

The liquid crystal layer LC2 has a plurality of reflective planes RS as represented by one-dot chain lines, between the alignment film AL21 and the alignment film AL22. The plurality of reflective planes RS are approximately parallel to each other. The reflective planes RS reflect a part of the circularly polarized light of the incident light and transmits the other part of the circularly polarized light according to the Bragg's law. In the X-Z section shown in FIG. 8, the reflective planes RS are inclined to a main surface LS of the liquid crystal layer LC2. In the Y-Z section, the reflective planes RS are parallel to the main surface LS, similarly to the example shown in FIG. V.

In this modified example, too, the same optical properties as those of the example shown in FIG. 6 and FIG. 7 can be implemented.

Figure 9:
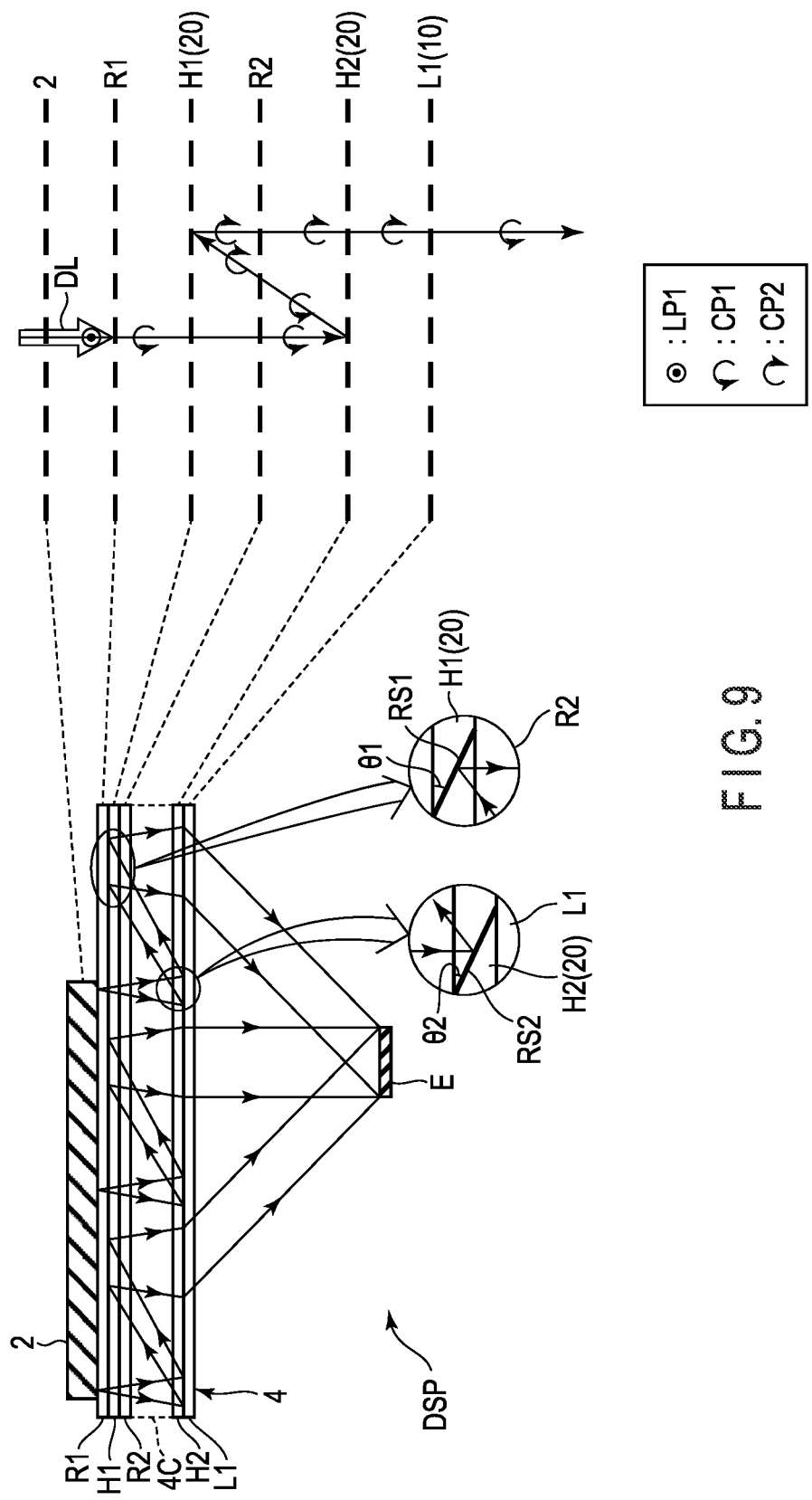
FIG. 9 is a view illustrating an optical effect of the display device DSP.

FIG. 9 is a view illustrating an optical effect of the display device DSP.

First, the display panel 2 emits the display light DL of the first linearly polarized light LP1. In this example, the first linearly polarized light LP1 is, for example, the linearly polarized light oscillated in a direction perpendicular to a sheet surface. The display light DL is assigned a quarter-wave phase difference when transmitted through the first retardation film R1. The display light DL is thereby converted into first circularly polarized light CP1 when transmitted through the first retardation film R1. In this example, the first circularly polarized light CP1 is, for example, left-handed circularly polarized light.

The first circularly polarized light CP1 transmitted through the first retardation film R1 is transmitted through the first semi-transparent element H1 (optical element 20).

The first circularly polarized light CP1 transmitted through the first semi-transparent element H1 is transmitted through the second retardation film R2 approximately perpendicularly. Since the planar phase difference of the second retardation film R2 is zero, as described with reference to FIG. 3, the polarization of the light transmitted through the second retardation film R2 approximately perpendicularly is maintained. That is, the light transmitted through the second retardation film R2 approximately perpendicularly is the first circularly polarized light CP1.

The first circularly polarized light CP1 transmitted through the second retardation film R2 is reflected on the second semi-transparent element H2 (optical element 20). At this time, the first circularly polarized light CP1 made incident on the second semi-transparent element H2 approximately perpendicularly is reflected on the reflective plane RS2 in the oblique direction, as shown and enlarged in FIG. 9. The reflection angle of the first circularly polarized light CP1 is controlled by an inclination angle θ2 of the reflective plane RS2. When the first circularly polarized light CP1 is reflected on the reflective plane RS2, the polarization is maintained. In other words, the light reflected on the reflective plane RS2 is the first circularly polarized light CP1.

The first circularly polarized light CP1 reflected on the second semi-transparent element H2 is obliquely transmitted through the second retardation film R2. As described with reference to FIG. 3, the second retardation film R2 assigns a half-wave phase difference to the light transmitted in the oblique direction. For this reason, the light transmitted through the second retardation film R2 in the oblique direction is converted into the second circularly polarized light CP2 reversed to the first circularly polarized light CP1. In this case, the second circularly polarized light CP2 is, for example, right-handed circularly polarized light.

The second circularly polarized light CP2 transmitted through the second retardation film R2 is reflected on the first semi-transparent element H1 (optical element 20). At this time, the second circularly polarized light CP2 made incident on the first semi-transparent element H1 in the oblique direction is reflected on the reflective plane RS1 in the normal of the first semi-transparent element H1, as shown and enlarged in FIG. 9. The reflection angle of the second circularly polarized light CP2 is controlled by an inclination angle θ1 of the reflective plane RS1. When the second circularly polarized light CP2 is reflected on the reflective plane RS1, the polarization is maintained. In other words, the light reflected on the reflective plane RS1 is the second circularly polarized light CP2.

The second circularly polarized light CP2 reflected on the first semi-transparent element H1 is transmitted through the second retardation film R2 approximately perpendicularly, and the polarization is maintained. The second circularly polarized light CP2 transmitted through the second retardation film R2 is transmitted through the second semi-transparent element H2. The second circularly polarized light CP2 transmitted through the second semi-transparent element H2 is converted into the first circularly polarized light CP1 in the first element L1 (liquid crystal element 10) and is condensed to user's pupil E by the lens action.

According to such a display device DSP, the optical system 4 includes an optical path that passes three times between the first semi-transparent element H1 and the second semi-transparent device H2. In other words, in the optical system 4, the optical distance between the first semi-transparent element H1 and the second semi-transparent element H2 is approximately three times as long as the actual interval between the first semi-transparent element H1 and the second semi-transparent element H2 (or the thickness of the air layer 4C). The display panel 2 is installed on an inner side than a focus of the liquid crystal element 10 having the lens action. The user can thereby observe an extended virtual image.

According to the first configuration example, when the absorption at each member constructing the display device DSP and the reflection between the members are ignored, approximately 100% of the display light DL emitted from the display panel 2 can be condensed to the pupil E and the use efficiency of the light can be improved.

In addition, the thickness in the third direction Z can be reduced and the weight reduction can be implemented as compared with an optical system comprising optical components formed of glass, resin, and the like.

The first circularly polarized light CP1 described with reference to FIG. 9 may be replaced with the second circularly polarized light CP2.

An example of a method of determining the width W1 of the first part P11 shown in FIG. 3 will be described with reference to FIG. 10 and FIG. 11.

Figure 10:
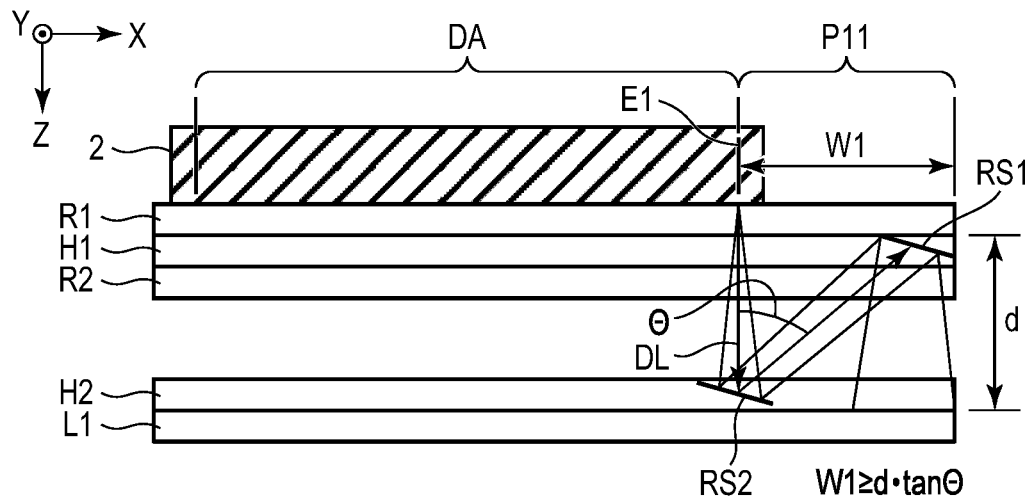
FIG. 10 is a view illustrating an optical path reaching the first part P11.

FIG. 10 is a view illustrating an optical path reaching the first part P11. An optical path of the display light DL emitted from the vicinity of the first end portion E1 of the display region DA is particularly focused.

The display light DL is transmitted substantially perpendicularly through the first retardation film R1, the first semi-transparent element H1, and the second retardation film R2, is reflected on the second semi-transparent element H2 in the oblique direction, and then reaches the first part P11 of the second retardation film R2 and the first semi-transparent element H1. In such an optical path, the angle formed between the optical path of the light made incident on the second semi-transparent element H2 and the optical path of the light reflected on the second semi-transparent element H2 is referred to as Θ. In addition, the distance in the third direction Z from the first semi-transparent element H1 to the second semi-transparent element H2 is referred to as d. At this time, the width W1 of the first part P11 is defined in the following manner.

$$W1 \geq d \cdot \tan \Theta$$

Figure 11:
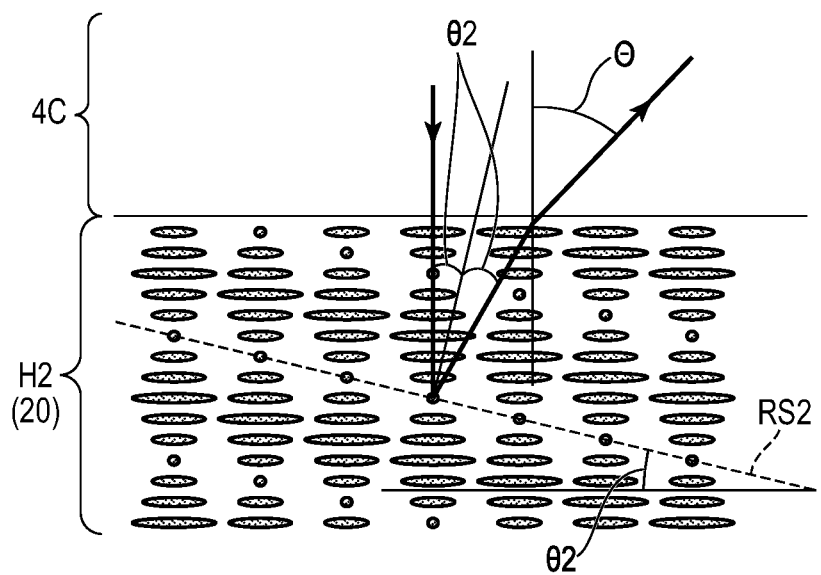
FIG. 11 is a view illustrating a relationship between an angle Θ shown in FIG. 10 and an inclination angle θ2 of a reflective plane RS2.

FIG. 11 is a view illustrating a relationship between an angle Θ shown in FIG. 10 and an inclination angle θ2 of a reflective plane RS2.

When the light made incident on the second semi-transparent element H2 substantially perpendicularly is specularly reflected on the reflective plane RS2, each of the incident angle and the reflected angle is equal to the inclination angle θ2 of the reflective plane RS2. The angle Θ shown in FIG. 10 corresponds to an angle of refraction of the light refracted on an interface between the second semi-transparent element H2 and the air layer 4C.

When a refractive index of the second semi-transparent element H2 (or a refractive index of the cholesteric liquid crystal) is referred to as n and a refractive index of the air layer 4C is 1, the angle of refraction Θ is defined in the following manner.

$$\Theta = \sin^{-1}(n \cdot \sin(2 \cdot \theta 2))$$

Figure 12:
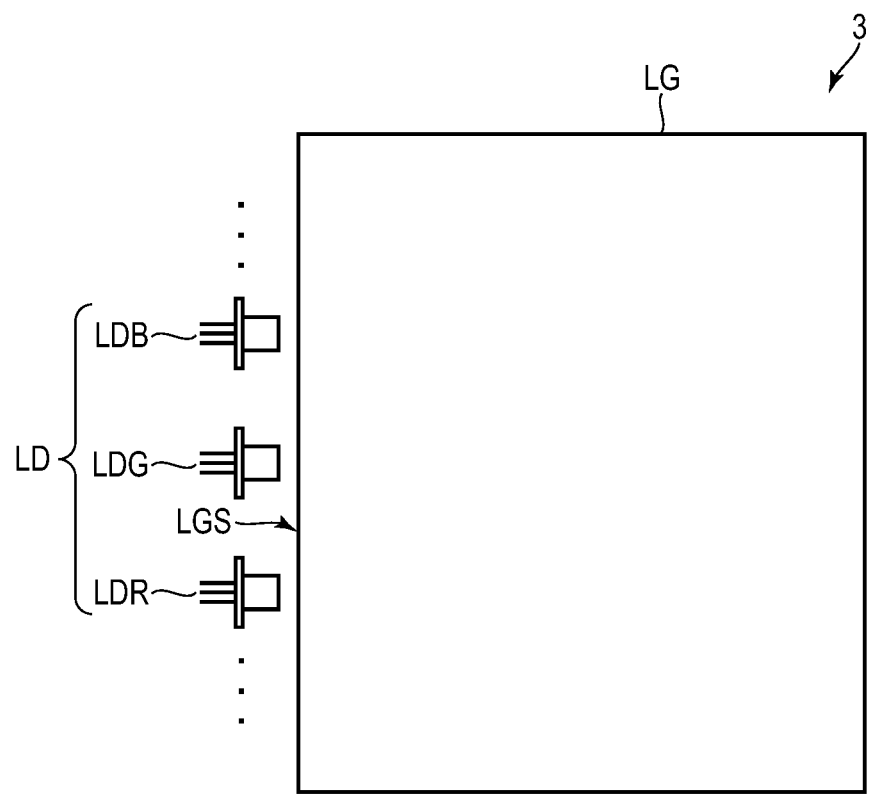
FIG. 12 is a plan view showing a configuration example of an illumination device 3 applicable to the display device DSP shown in FIG. 3.

FIG. 12 is a plan view showing a configuration example of an illumination device 3 applicable to the display device DSP shown in FIG. 3. Only main portions of the illumination device 3 are shown in FIG. 12.

The illumination device 3 comprises a light guide LG and a plurality of light emitting elements LD. Each of the plurality of light emitting elements is opposed to a side surface LGS of the light guide LG. The light emitting element LD includes a first light emitting element LDB emitting light of a blue wavelength (first wavelength), a second light emitting element LDG emitting light of a green wavelength (second wavelength), and a third light emitting element LDR emitting light of a red wavelength (third wavelength). The first light emitting element LDB, the second light emitting element LDG, and the third light emitting element LDR are arranged with intervals.

The light emitted from the light emitting element LD desirably has a narrow spectral width (or a high color purity). For this reason, a laser light source is desirably used as the light emitting element LD. A center wavelength of the blue laser light emitted from the first light emitting element (first laser light source) LDB is referred to as λb, a center wavelength of the green laser light emitted from the second light emitting element (second laser light source) LDG is referred to as λg, and a center wavelength of the red laser light emitted from the third light emitting element (third laser light source) LDR is referred to as λr.

The illumination device 3 is not limited to the structure shown in FIG. 7, but may be a direct type illumination device in which the light emitting element LD is arranged just under the display panel.

FIG. 13 is a cross-sectional view showing a first configuration example of a head-mounted display 1. The head-mounted display 1 comprises the display device DSPR for a right eye, the display device DSPL for a left eye, and a frame FR holding the display devices DSPR and DSL. However, the head-mounted display 1 comprises a single display panel 2 and a single illumination device 3. In other words, the display panel 2 and the illumination device 3 are arranged over the display devices DSPR and DSPL.

The illumination device 3 corresponds to the illumination device 3 described with reference to FIG. 12, and comprises the first light emitting element LDB emitting blue laser light of the center wavelength λb, the second light emitting element LDG emitting green laser light of the center wavelength λg, and the third light emitting element LDR emitting red laser light of the center wavelength λr, which are not described here in detail.

The display panel 2 comprises a first substrate SUB1, a second substrate SUB2, a liquid crystal layer LC, a polarizer PL1, and a polarizer PL2. The liquid crystal layer LC is held between the first substrate SUB1 and the second substrate SUB2, and is sealed by a seal SE. The first polarizer PL1 is arranged between the illumination device 3 and the first substrate SUB1. The second polarizer PL2 is arranged between the second substrate SUB2 and the first retardation film R1 of the optical systems 4R and 4L.

The display region DA of the display panel 2 is configured to selectively modulate the illumination light from the illumination device 3. The display region DA is opposed over the display devices DSPR and DSPL. For example, in the display region DA, a region of a right half side of the drawing is configured to displays an image for a right eye, and a region of a left half side of the drawing is configured to display an image for a left eye. Part of the illumination light modulated in the display region DA is transmitted through the second polarizer PL2, and converted into display light DLR of the linearly polarized light for a right eye and display light DLL of the linearly polarized light for a left eye.

The optical system 4L of the display device DSPL comprises the first retardation film R1, the first semi-transparent element H1, the second retardation film R2, the second semi-transparent element H2, and the first element L1. The first retardation film R1 and the second retardation film R2 are arranged over the display devices DSPR and DSPL.

The first semi-transparent element H1 is arranged between the first retardation film R1 and the second retardation film R2. The first semi-transparent element H1 comprises a first optical element 20B, a second optical element 20G, and a third optical element 20R. Each of the first optical element 20B, the second optical element 20G, and the third optical element 20R has the reflective plane RS1. An angle formed between the reflective plane RS1 and the reference plane RF (X-Y plane) is an acute angle counter-clockwise from the reference plane RF.

The first optical element 20B, the second optical element 20G, and the third optical element 20R are stacked in the third direction Z. The order of stacking the first optical element 20B, the second optical element 20G, and the third optical element 20R is not limited to the example shown in the drawing. The first optical element 20B, the second optical element 20G, and the third optical element 20R are equivalent to the optical element 20 described with reference to FIG. 6, FIG. 7, and the like.

However, the first optical element 20B is configured to reflect the second circularly polarized light of the blue wavelength (first wavelength) Ab and transmit the first circularly polarized light of the blue wavelength λb. In other words, a first helical pitch P1 of a liquid crystal structure (first cholesteric liquid crystal) LMS21 included in the first optical element 20B is optimized to correspond to the center wavelength λb of the blue laser light emitted from the first light emitting element LDB of the illumination device 3 as shown in FIG. 14.

In addition, the second optical element 20G is configured to reflect the second circularly polarized light of the green wavelength (second wavelength) λg and transmit the first circularly polarized light of the green wavelength λg. In other words, a second helical pitch P2 of a liquid crystal structure (second cholesteric liquid crystal) LMS22 included in the second optical element 20G is optimized to correspond to the center wavelength λg of the green laser light emitted from the second light emitting element LDG of the illumination device 3 as shown in FIG. 14. For this reason, the second helical pitch P2 in the second optical element 20G is larger than the first helical pitch P1 in the first optical element 20B.

Furthermore, the third optical element 20R is configured to reflect the second circularly polarized light of the red wavelength (third wavelength) λr and transmit the first circularly polarized light of the red wavelength λr. In other words, a third helical pitch P3 of a liquid crystal structure (third cholesteric liquid crystal) LMS23 included in the third optical element 20R is optimized to correspond to the center wavelength λr of the red laser light emitted from the third light emitting element LDR of the illumination device 3 as shown in FIG. 14. For this reason, the third helical pitch P3 in the third optical element 20R is larger than the second helical pitch P2 in the second optical element 20G.

Figure 14:
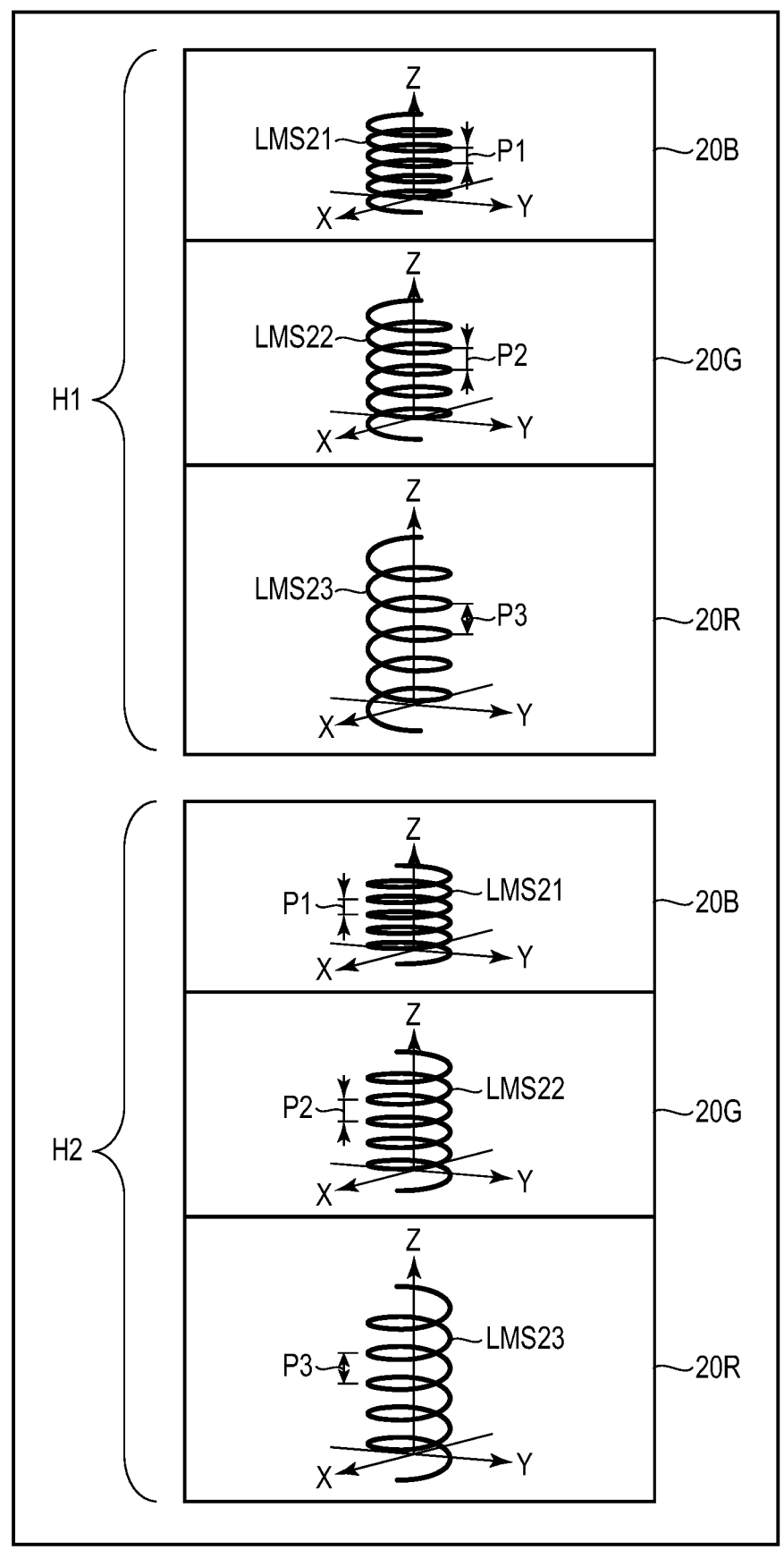
FIG. 14 is a view illustrating a first optical element 20B, a second optical element 20G, and a third optical element 20R shown in FIG. 13.

The cholesteric liquid crystal turning in a first turning direction is schematically shown and enlarged in FIG. 14. All the first cholesteric liquid crystal LMS21, the second cholesteric liquid crystal LMS22, and the third cholesteric liquid crystal LMS23 in the first semi-transparent element H1 are configured to turn in the same direction and reflect the right-handed second circularly polarized light.

The second semi-transparent element H2 is opposed to the second retardation film R2 through the air layer 4C. The second semi-transparent element H2 comprises the first optical element 20B, the second optical element 20G, and the third optical element 20R, similarly to the first semi-transparent element H1. Each of the first optical element 20B, the second optical element 20G, and the third optical element 20R has the reflective plane RS2. An angle formed between the reflective plane RS2 and the reference plane RF (X-Y plane) is an acute angle counterclockwise from the reference plane. In other words, the direction of the reflective plane RS2 is the same as the direction of the reflective plane RS1.

In the second semi-transparent element H2, the first optical element 20B, the second optical element 20G, and the third optical element 20R are stacked in the third direction Z. The order of stacking the first optical element 20B, the second optical element 20G, and the third optical element 20R is not limited to the example shown in the drawing, but the order of stacking in the first semi-transparent element H1 is the same as the order of stacking in the second semi-transparent element H2.

The first optical element 20B, the second optical element 20G, and the third optical element 20R in the second semi-transparent element H2 are equivalent to the first optical element 20B, the second optical element 20G, and the third optical element 20R in the first semi-transparent element H1, respectively.

In the second semi-transparent element H2, however, the first optical element 20B is configured to reflect the first circularly polarized light of the blue wavelength (first wavelength) λb and transmit the second circularly polarized light of the blue wavelength λb. In other words, the first optical element 20B of the second semi-transparent element H2 includes the liquid crystal structure (first cholesteric liquid crystal) LMS21 turning in the second turning direction reverse to the first turning direction, as shown in FIG. 14. The turning direction of the liquid crystal structure LMS2l of the second semi-transparent element H2 is reverse to the turning direction of the liquid crystal structure LMS21 of the first semi-transparent element H1.

The first helical pitch P1 of the liquid crystal structure LMS21 is optimized to correspond to the center wavelength λb of the blue laser light emitted from the first light emitting element LDB of the illumination device 3, as shown in FIG. 14. The first helical pitch P1 of the liquid crystal structure LMS2l of the second semi-transparent element H2 is equal to the first helical pitch P1 of the liquid crystal structure LMS21 of the first semi-transparent element H1.

The second optical element 20G is configured to reflect the first circularly polarized light of the green wavelength (second wavelength) λg and transmit the second circularly polarized light of the green wavelength λg. In other words, the second optical element 20G of the second semi-transparent element H2 includes the liquid crystal structure (second cholesteric liquid crystal) LMS22 turning to the second turning direction, as shown in FIG. 14. The turning direction of the liquid crystal structure LMS22 of the second semi-transparent element H2 is reverse to the turning direction of the liquid crystal structure LMS22 of the first semi-transparent element H1.

The second helical pitch P2 of the liquid crystal structure LMS22 is optimized to correspond to the center wavelength λg of the green laser light emitted from the second light emitting element LDG of the illumination device 3, as shown in FIG. 14. For this reason, the second helical pitch P2 in the second optical element 20G is larger than the first helical pitch P1 in the first optical element 20B. The second helical pitch P2 of the liquid crystal structure LMS22 of the second semi-transparent element H2 is equal to the second helical pitch P2 of the liquid crystal structure LMS22 of the first semi-transparent element H1.

The third optical element 20R is configured to reflect the first circularly polarized light of the red wavelength (third wavelength) λr and transmit the second circularly polarized light of the red wavelength λr. In other words, the third optical element 20R of the second semi-transparent element H2 includes the liquid crystal structure (third cholesteric liquid crystal) LMS23 turning to the second turning direction, as shown in FIG. 14. The turning direction of the liquid crystal structure LMS23 of the second semi-transparent element H2 is reverse to the turning direction of the liquid crystal structure LMS23 of the first semi-transparent element H1. The third helical pitch P3 of the liquid crystal structure LMS23 is optimized to correspond to the center wavelength λr of the red laser light emitted from the third light emitting element LDR of the illumination device 3, as shown in FIG. 14. For this reason, the third helical pitch P3 in the third optical element 20R is larger than the second helical pitch P2 in the second optical element 20G. The third helical pitch P3 of the liquid crystal structure LMS23 of the second semi-transparent element H2 is equal to the third helical pitch P3 of the liquid crystal structure LMS23 of the first semi-transparent element H1.

All the first cholesteric liquid crystal LMS21, the second cholesteric liquid crystal LMS22, and the third cholesteric liquid crystal LMS23 in the second semi-transparent element H2 are configured to turn in the same direction and reflect the left-handed first circularly polarized light.

Thus, when the wavelength λb of the circularly polarized light emitted from the first optical element 20B in the first semi-transparent element H1 and the second semi-transparent element H2 is referred to as a first wavelength, the second optical element 20G is configured to reflect the circularly polarized light of the second wavelength λg longer than the first wavelength λb, and the third optical element 20R is configured to reflect the circularly polarized light of the third wavelength λr longer than the second wavelength λg.

The first element L1 comprises a liquid crystal element 10. The liquid crystal element is equivalent to the liquid crystal element 10 described with reference to FIG. 4 and FIG. 5.

The liquid crystal element 10 assigns, for example, a half-wave phase difference to the light of the green wavelength (second wavelength) λg and has a lens action of condensing at least the second circularly polarized light of the green wavelength λg. In other words, the retardation of the liquid crystal element 10 is optimized to correspond to the center wavelength λg of the green laser light emitted from the second light emitting element LDG of the illumination device 3.

The liquid crystal element 10 applied to the embodiments also has a lens action of condensing the second circularly polarized light of not only the green wavelength λg, but also the blue wavelength λb and the red wavelength λr.

The optical system 4R in the display device DSPR is configured similarly to the optical system 4L, and comprises the first retardation film R1, a third semi-transparent device H3, the second retardation film R2, a fourth semi-transparent device H4, and a second element L2.

The third semi-transparent element H3 is arranged between the first retardation film R1 and the second retardation film R2 in the third direction Z, and is adjacent to the first semi-transparent element H1 in the first direction X. The fourth semi-transparent device H4 is separated from the second retardation film R2 in the third direction Z, and is adjacent to the second semi-transparent element H2 in the first direction X.

The second element L2 is in contact with the fourth semi-transparent device H4 in the third direction Z and is adjacent to the first element L1 in the first direction X.

Each of the third semi-transparent element H3 and the fourth semi-transparent device H4 comprises the first optical element 20B, the second optical element 20G, and the third optical element 20R, similarly to the first semi-transparent element H1.

The first optical element 20B, the second optical element 20G, and the third optical element 20R in the third semi-transparent device H3 are equivalent to the first optical element 20B, the second optical element 20G, and the third optical element 20R in the first semi-transparent element H1, respectively, and are configured to transmit the first circularly polarized light and reflect the second circularly polarized light. However, the first semi-transparent element H1 is different from the third semi-transparent device H3 in direction of the reflective plane.

That is, each of the first optical element 20B, the second optical element 20G, and the third optical element 20R in the third semi-transparent device H3 has a reflective plane RS3. An angle formed between the reflective plane RS3 and the reference plane RF (X-Y plane) is an acute angle clockwise from the reference plane RF. In other words, the reflective plane RS3 is different from the reflective plane RS1 in direction.

The first optical element 20B, the second optical element 20G, and the third optical element 20R in the fourth semi-transparent device H4 are equivalent to the first optical element 20B, the second optical element 20G, and the third optical element 20R in the second semi-transparent element H2, respectively, and are configured to reflect the first circularly polarized light and transmit the second circularly polarized light. However, the second semi-transparent element H2 is different from the fourth semi-transparent device H4 in direction of the reflective plane.

That is, each of the first optical element 20B, the second optical element 20G, and the third optical element 20R in the fourth semi-transparent device H4 has a reflective plane RS4. An angle formed between the reflective plane RS4 and the reference plane RF (X-Y plane) is an acute angle clockwise from the reference plane RF. In other words, the reflective plane RS4 is different from the reflective plane RS2 in direction. In addition, the direction of the reflective plane RS4 is the same as the direction of the reflective plane RS3.

The second element L2 comprises a liquid crystal element 10, similarly to the first element L1. However, a position where the light is condensed by the first device L1 and a position where the light is condensed by the second device L2 are different from each other.

In such a head-mounted display 1, the display light DLL of the display device DSPL is reflected on the reflective plane RS2 of the second semi-transparent element H2, then reflected on the reflective plane RS1 of the first semi-transparent element H1, and condensed on the user's left eye by the lens action of the first element L1. However, the display light DLL of the blue wavelength λb is reflected on the first optical elements 20B of the first semi-transparent element H1 and the second semi-transparent device H2 and then condensed by the liquid crystal element 10 of the first device L1, the display light DLL of the green wavelength λg is reflected on the second optical elements 20G of the first semi-transparent device H1 and the second semi-transparent device H2 and then condensed by the liquid crystal element 10 of the first device L1, and the display light DLL of the red wavelength λr is reflected on the third optical elements 20R of the first semi-transparent device H1 and the second semi-transparent device H2 and then condensed by the liquid crystal element 10 of the first device L1.

In addition, the display light DLR of the display device DSPR is reflected on the reflective plane RS4 of the fourth semi-transparent device H4, then reflected on the reflective plane RS3 of the third semi-transparent element H3, and condensed on the user's right eye by the lens action of the second device L2. However, the display light DLL of the blue wavelength λb is reflected on the first optical elements 20B of the third semi-transparent element H3 and the fourth semi-transparent device H4 and then condensed by the liquid crystal element 10 of the second device L2, the display light DLL of the green wavelength λg is reflected on the second optical elements 20G of the third semi-transparent device H3 and the fourth semi-transparent device H4 and then condensed by the liquid crystal element 10 of the second device L2, and the display light DLL of the red wavelength λr is reflected on the third optical elements 20R of the third semi-transparent device H3 and the fourth semi-transparent device H4 and then condensed by the liquid crystal element 10 of the second device L2.

According to such a first configuration example, the illumination device 3 comprises the laser light source which emits the light of a narrow spectral width, and the liquid crystal element 10 and the optical element 20 are optimized in accordance with the center wavelength of the light emitted from the laser light source. Thus, light of each wavelength can be condensed efficiently, a chromatic aberration can be reduced, and a clear image can be visually recognized by the user.

Next, the other configuration examples of the embodiments will be described. The same constituent elements as those of the first configuration example are denoted by the same reference numerals and their explanations may be omitted.

Second Configuration Example

Figure 15:
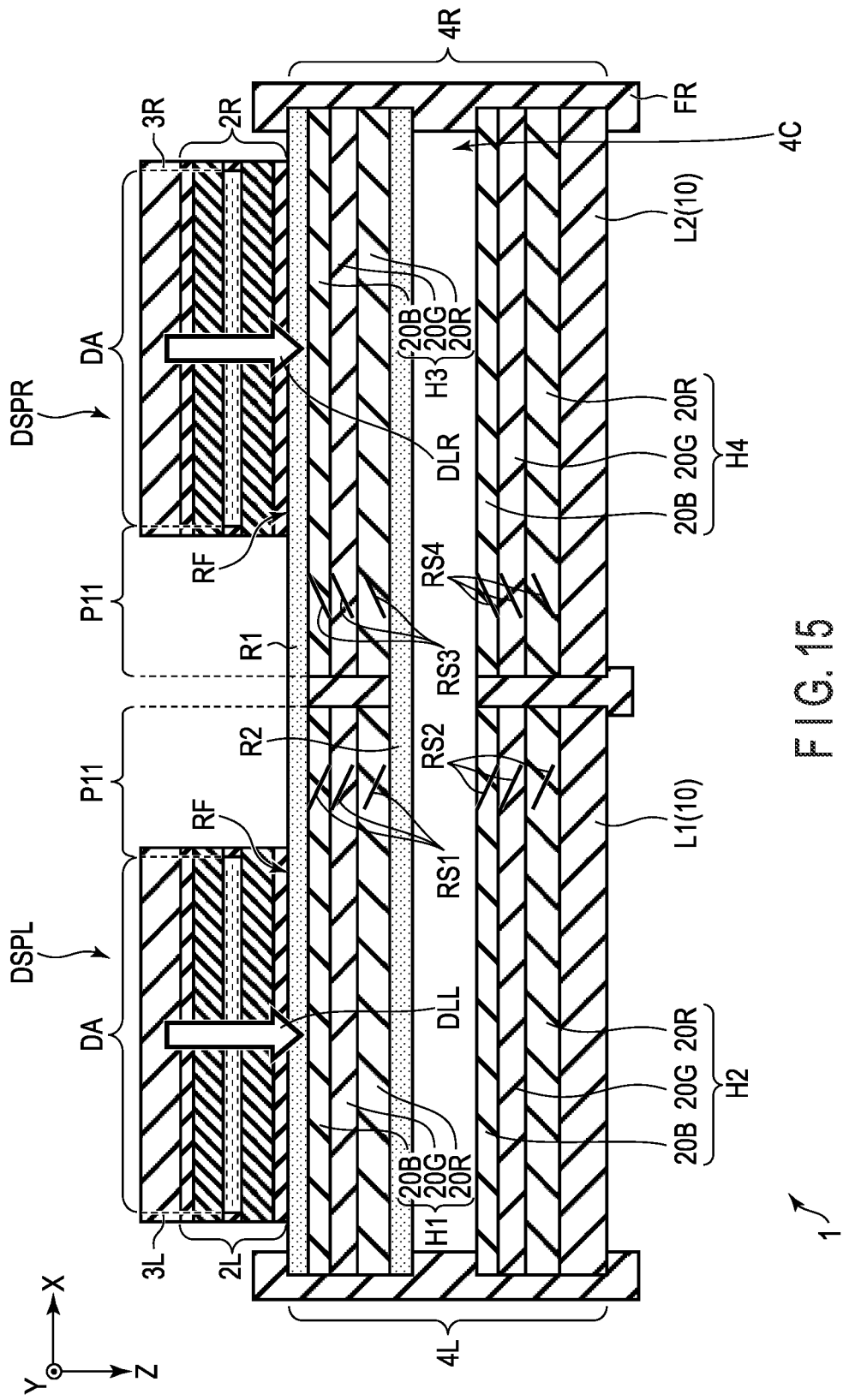
FIG. 15 is a cross-sectional view showing a second configuration example of the head-mounted display 1.

FIG. 15 is a cross-sectional view showing a second configuration example of the head-mounted display 1. The second configuration example shown in FIG. 15 is different from the first configuration example shown in FIG. 13 in that the head-mounted display 1 comprises the display panel 2R and the illumination device 3R for a right eye, and the display panel 2L and the illumination device 3L for a left eye.

Each of the illumination devices 3R and 3L corresponds to the illumination device 3 described with reference to FIG. 12. The display panels 2R and 2L are configured to emit display light DLR and DLL of the linearly polarized light in the display regions DA, respectively. The display panels 2R and 2L are arranged with an interval in the first direction X. A first part P11 of the optical system 4L and a first part P11 of the optical system 4R are located between the display panel 2R and the display panel 2L.

The main configurations of the optical systems 4L and 4R shown in FIG. 15 are equivalent to the configurations of the optical systems 4L and 4R shown in FIG. 13. As regards the reflective plane RS1 of the first semi-transparent element H1, the reflective plane RS2 of the second semi-transparent device H2, the reflective plane RS3 of the third semi-transparent device H3, and the reflective plane RS4 of the fourth semi-transparent device H4, however, the first configuration example shown in FIG. 13 is different in direction from the second configuration example shown in FIG. 15.

In the second configuration example shown in FIG. 15, an angle formed between the reflective plane RS1 and the reference plane RF (or X-Y plane) and an angle formed between the reflective plane RS2 and the reference plane RF are acute angles clockwise from the reference plane RF. An angle formed between the reflective plane RS3 and the reference plane RF and an angle formed between the reflective plane RS4 and the reference plane RF are acute angles counterclockwise from the reference plane RF.

In the second configuration example, too, the same advantages as those of the first configuration example can be obtained.

Third Configuration Example

Figure 16:
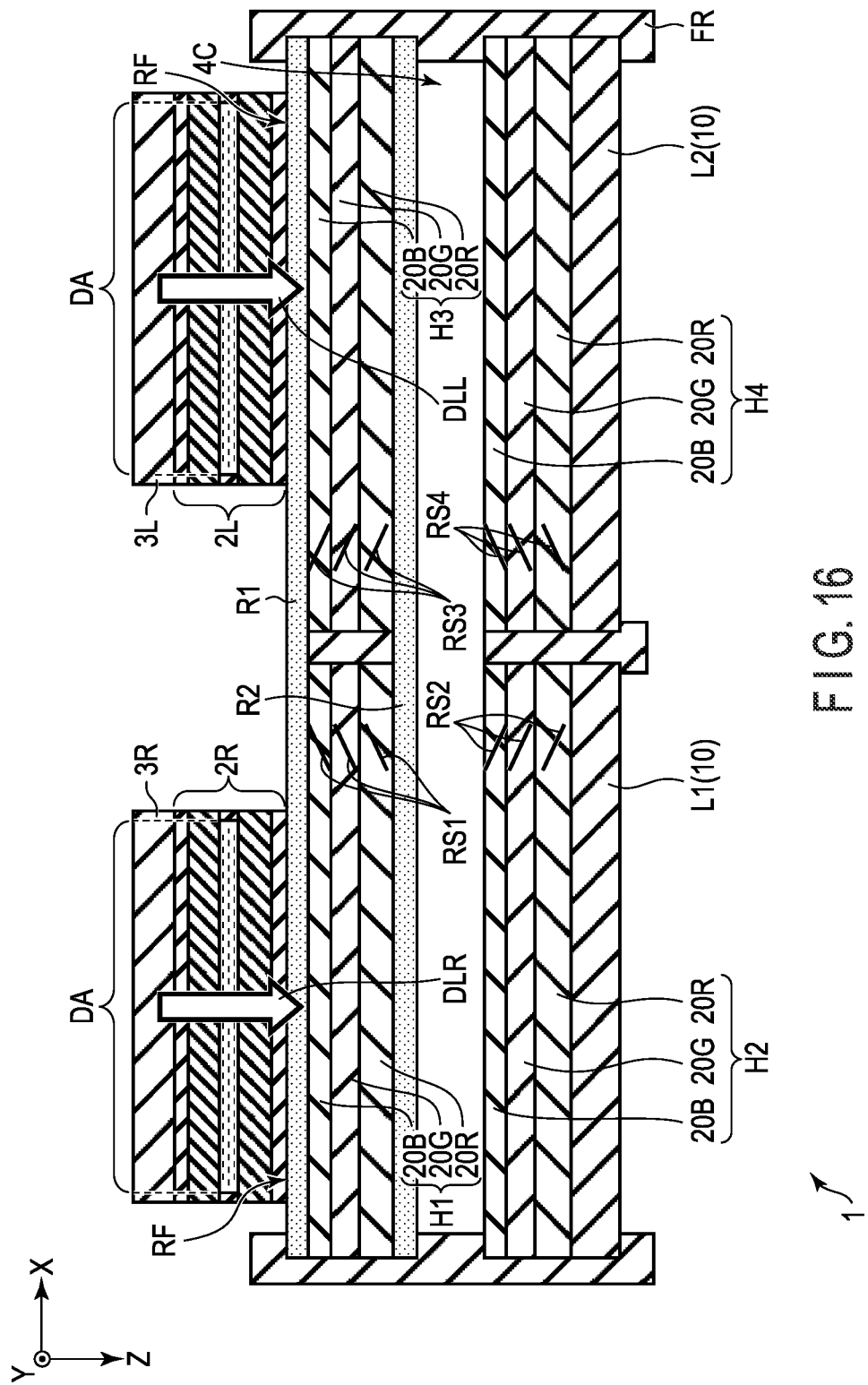
FIG. 16 is a cross-sectional view showing a third configuration example of the head-mounted display 1.

FIG. 16 is a cross-sectional view showing a third configuration example of the head-mounted display 1. The third configuration example shown in FIG. 16 is different from the second configuration example shown in FIG. 15 in that the display panel 2R and the illumination device 3R for a right eye are arranged on the left side of the drawing, and the display panel 2L and the illumination device 3L for a left eye are arranged on the right side of the drawing. The display panel 2R is configured to emit the display light DLR of the linearly polarized light in the display region DA. The display panel 2L is configured to emit the display light DLL of the linearly polarized light in the display region DA.

As regards the reflective plane RS1 of the first semi-transparent element H1 and the reflective plane RS3 of the third semi-transparent device H3, the second configuration example shown in FIG. 15 is different in direction from the third configuration example shown in FIG. 16. In addition, as regards the reflective plane RS2 of the second semi-transparent element H2 and the reflective plane RS4 of the fourth semi-transparent device H4, the second configuration example shown in FIG. 15 is similar in direction to the third configuration example shown in FIG. 16.

In the third configuration example shown in FIG. 16, an angle formed between the reflective plane RS1 and the reference plane RF (or X-Y plane) and an angle formed between the reflective plane RS4 and the reference plane RF are acute angles counterclockwise from the reference plane RF. An angle formed between the reflective plane RS2 and the reference plane RF and an angle formed between the reflective plane RS3 and the reference plane RF are acute angles counterclockwise from the reference plane RF.

The reflective plane RS1 and the reflective plane RS2 are different in direction from each other, and the reflective plane RS1 and the reflective plane RS3 are different in direction from each other. The reflective plane RS2 and the reflective plane RS4 are different in direction from each other, and the reflective plane RS3 and the reflective plane RS4 are different in direction from each other.

FIG. 17 is a view illustrating an optical action of the head-mounted display 1 shown in FIG. 16. The optical path in which the display light DLR from the display panel 2R for a right eye reaches the right eye ER will be focused here. The polarized state of the light is shown in FIG. 9, and its illustration in FIG. 17 is omitted.

First, the display panel 2R emits the display light DLR. The display light DLR is the first linearly polarized light LP1. The display light DLR is converted into the first circularly polarized light CP1 when transmitted through the first retardation film R1. The first circularly polarized light CP1 transmitted through the first retardation film R1 is transmitted through the first semi-transparent element H1 (optical elements 20B, 20G, and 20R).

The first circularly polarized light CP1 which has been transmitted through the first semi-transparent element H1 is transmitted through the second retardation film R2 approximately perpendicularly and reflected on the second semi-transparent element H2 (optical elements 20B, 20G, and 20R). For example, the display light DLR of the blue wavelength $\lambda b$ is reflected on the first optical element 20B, the display light DLR of the green wavelength $\lambda g$ is reflected on the second optical element 20G, and the display light DLR of the red wavelength $\lambda r$ is reflected on the third optical element 20R. The second semi-transparent element H2 reflects the first circularly polarized light CP1 toward the third semi-transparent device H3 overlaid on the display panel 2L.

The first circularly polarized light CP1 reflected on the second semi-transparent element H2 is converted into the second circularly polarized light CP2 when obliquely transmitted through the second retardation film R2. The second circularly polarized light CP2 transmitted through the second retardation film R2 is reflected on the third semi-transparent device H3 (optical elements 20B, 20G, and 20R). The third semi-transparent device H3 reflects the second circularly polarized light CP2 toward the fourth semi-transparent device H4 overlaid on the display panel 2L.

The second circularly polarized light CP2 reflected on the third semi-transparent device H3 is transmitted through the fourth semi-transparent device H4 after transmitted through the second retardation film R2 approximately perpendicularly. The second circularly polarized light CP2 transmitted through the fourth semi-transparent element H4 is converted into the first circularly polarized light CP1 in the second element L2 (liquid crystal element 10) and is condensed to the user's right eye ER by the lens action.

Similarly, the display light DLL from the display panel 2L for the left eye also reaches the left eye EL.

In the third configuration example, too, the same advantages as those of the first configuration example can be obtained.

Fourth Configuration Example

Figure 18:
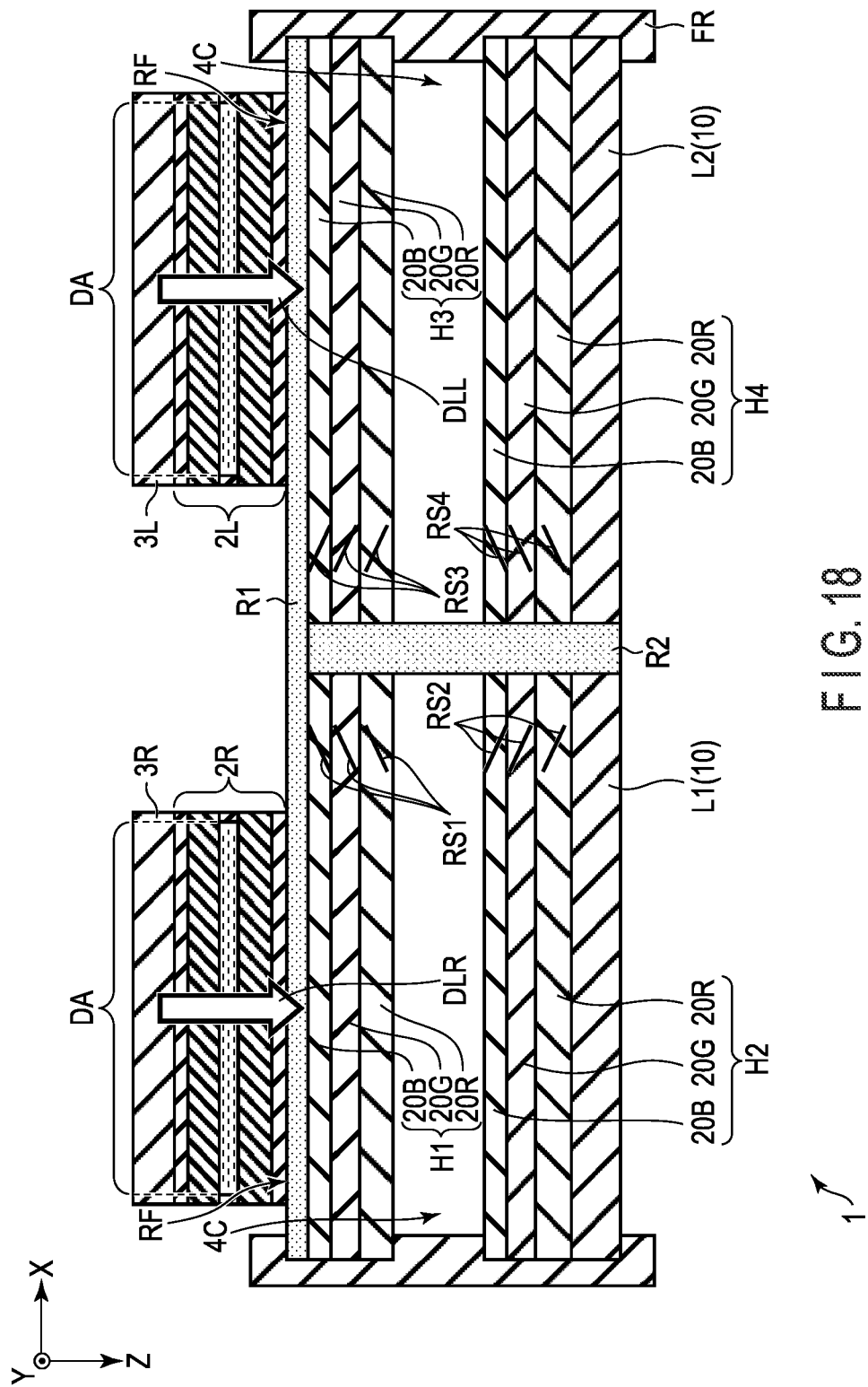
FIG. 18 is a cross-sectional view showing a fourth configuration example of the head-mounted display 1.

FIG. 18 is a cross-sectional view showing a fourth configuration example of the head-mounted display 1. The fourth configuration example shown in FIG. 18 is different from the third configuration example shown in FIG. 16 in that the second retardation film R2 is arranged between the first semi-transparent element H1 and the third semi-transparent device H3 and between the second semi-transparent element H2 and the fourth semi-transparent device H4.

The second retardation film R2 is formed in a flat plate extending along the Y-Z plane and has a thickness along the first direction X. In other words, the second retardation film R2 has a refractive anisotropy that the refractive indexes of the directions orthogonal to each other in the Y-Z plane are approximately equal and that the refractive index of the first direction X is different from the in-plane refractive index. Such a second retardation film R2 does not assign the phase difference to the light passing through an optical path parallel to the first direction X, but assigns the half-wave phase difference to the light passing through an optical path in the direction oblique to the first direction X.

The first semi-transparent element H1 and the second semi-transparent element H2 are opposed through the air layer 4C in the third direction Z. The third semi-transparent element H3 and the fourth half transmission device H4 are opposed through the air layer 4C in the third direction Z. The second retardation film R2 separates the air layer 4C on the right side of the drawing from the air layer 4C on the left side of the drawing.

FIG. 19 is a view illustrating the optical action of the head-mounted display 1 shown in FIG. 18. The optical path in which the display light DLR from the display panel 2R for a right eye reaches the right eye ER will be focused here. The polarized state of the light is shown in FIG. 9, and its illustration in FIG. 19 is omitted.

First, the display panel 2R emits the display light DLR. The display light DLR is the first linearly polarized light LP1. The display light DLR is converted into the first circularly polarized light CP1 when transmitted through the first retardation film R1. The first circularly polarized light CP1 transmitted through the first retardation film R1 is transmitted through the first semi-transparent element H1 (optical elements 20B, 20G, and 20R).

The first circularly polarized light CP1 transmitted through the first semi-transparent element H1 is reflected on the second semi-transparent element H2 (optical elements 20B, 20G, and 20R). The second semi-transparent element H2 reflects the first circularly polarized light CP1 toward the third semi-transparent device H3 overlaid on the display panel 2L.

The first circularly polarized light CP1 reflected on the second semi-transparent element H2 is converted into the second circularly polarized light CP2 when obliquely transmitted through the second retardation film R2. The second circularly polarized light CP2 transmitted through the second retardation film R2 is reflected on the third semi-transparent device H3 (optical elements 20B, 20G, and 20R). The third semi-transparent device H3 reflects the second circularly polarized light CP2 toward the fourth semi-transparent device H4 overlaid on the display panel 2L.

The second circularly polarized light CP2 transmitted through the third semi-transparent device H3 is transmitted through the fourth semi-transparent device H4, then converted into the first circularly polarized light CP1 in the second element L2 (liquid crystal element 10) and condensed to the user's right eye ER by the lens action.

Similarly, the display light DLL from the display panel 2L for the left eye also reaches the left eye EL.

In the fourth configuration example, too, the same advantages as those of the first configuration example can be obtained.

Fifth Configuration Example

Figure 20:
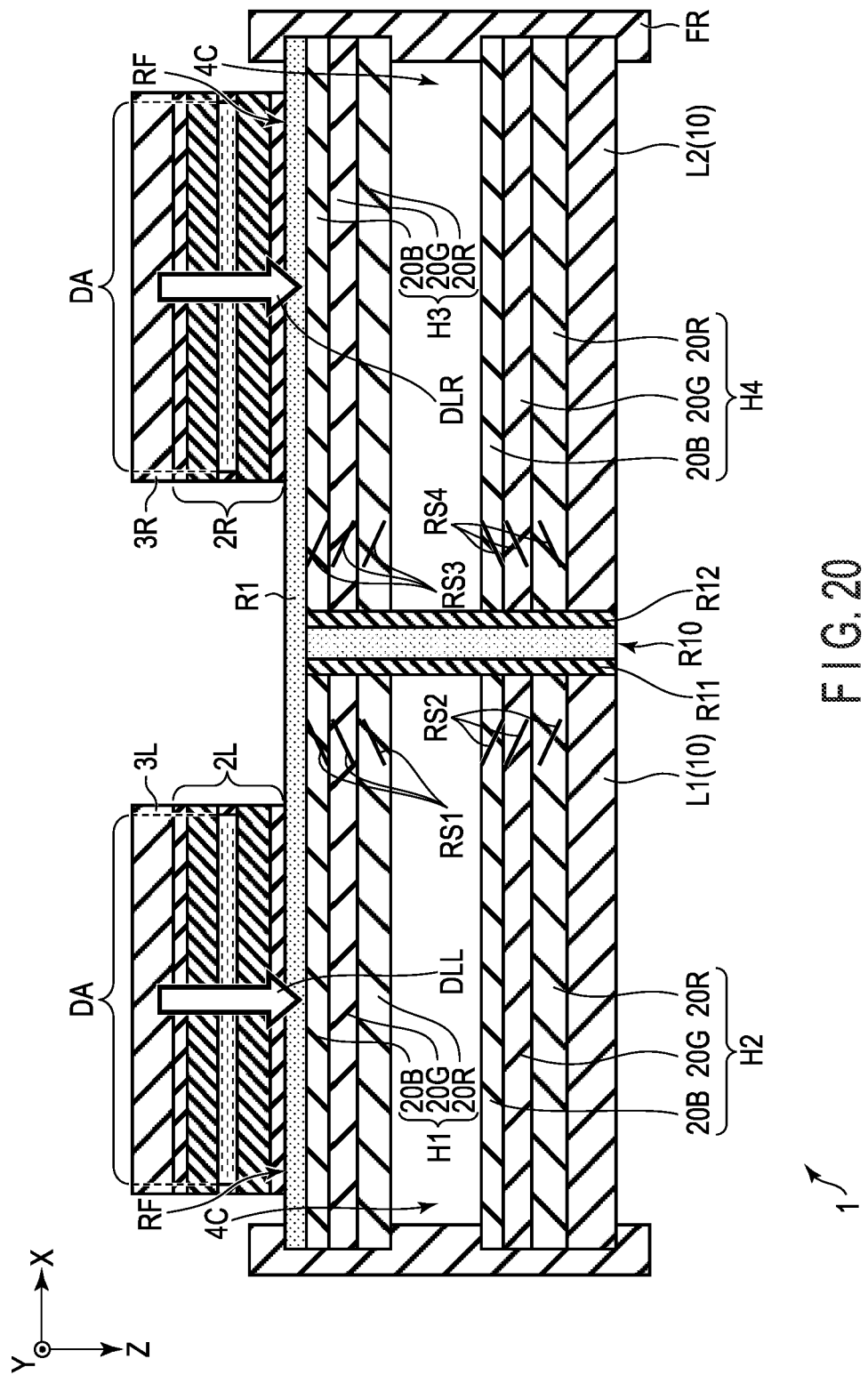
FIG. 20 is a cross-sectional view showing a fifth configuration example of the head-mounted display 1.

FIG. 20 is a cross-sectional view showing a fifth configuration example of the head-mounted display 1. The fifth configuration example shown in FIG. 20 is different from the fourth configuration example shown in FIG. 18 in that the second retardation film R2 is replaced with a reflecting member R10.

The reflecting member R10 is arranged between the first semi-transparent element H1 and the third semi-transparent device H3 and between the second semi-transparent element H2 and the fourth semi-transparent device H4. The reflecting member R10 has a first reflective plane R11 facing the first semi-transparent element H1 and the second semi-transparent element H2, and a second reflective plane R12 facing the third semi-transparent device H3 and the fourth semi-transparent device H4. The first reflective plane R11 and the second reflective plane R12 extend along the Y-Z plane. The reflecting member R10 separates the air layer 4C on the right side of the drawing from the air layer 4C on the left side of the drawing.

Figure 21:
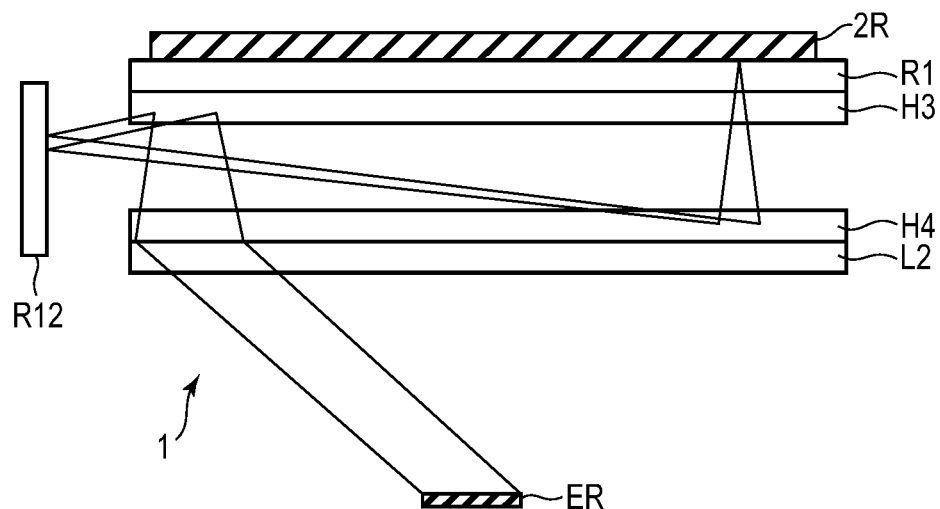
FIG. 21 is a view illustrating an optical action of the head-mounted display 1 shown in FIG. 20.

FIG. 21 is a view illustrating an optical action of the head-mounted display 1 shown in FIG. 20. The optical path in which the display light DLR from the display panel 2R for a right eye reaches the right eye ER will be focused here. In addition, since optical paths are complicated, only one optical path is illustrated. The polarized state of the light is shown in FIG. 9, and its illustration in FIG. 21 is omitted.

First, the display panel 2R emits the display light DLR. The display light DLR is the first linearly polarized light LP1. The display light DLR is converted into the first circularly polarized light CP1 when transmitted through the first retardation film R1. The first circularly polarized light CP1 transmitted through the first retardation film R1 is transmitted through the third semi-transparent element H3 (optical elements 20B, 20G, and 20R).

The first circularly polarized light CP1 transmitted through the third semi-transparent device H3 is transmitted through the fourth semi-transparent element H4 (optical elements 20B, 20G, and 20R). The fourth semi-transparent element H4 reflects the first circularly polarized light CP1 toward the second reflective plane R12.

The first circularly polarized light CP1 reflected on the fourth semi-transparent element H4 is converted into the second circularly polarized light CP2 after reflected on the second reflective plane R12. The second circularly polarized light CP2 reflected on the second reflective plane R12 is reflected on the third semi-transparent device H3 (optical elements 20B, 20G, and 20R). The third semi-transparent device H3 reflects the second circularly polarized light CP2 toward the fourth semi-transparent device H4.

The second circularly polarized light CP2 transmitted through the third semi-transparent device H3 is transmitted through the fourth semi-transparent device H4, then converted into the first circularly polarized light CP1 in the second element L2 (liquid crystal element 10) and condensed to the user's right eye ER by the lens action.

Similarly, the display light DLL from the display panel 2L for the left eye also reaches the left eye EL.

In the fifth configuration example, too, the same advantages as those of the first configuration example can be obtained.

Sixth Configuration Example

Figure 22:
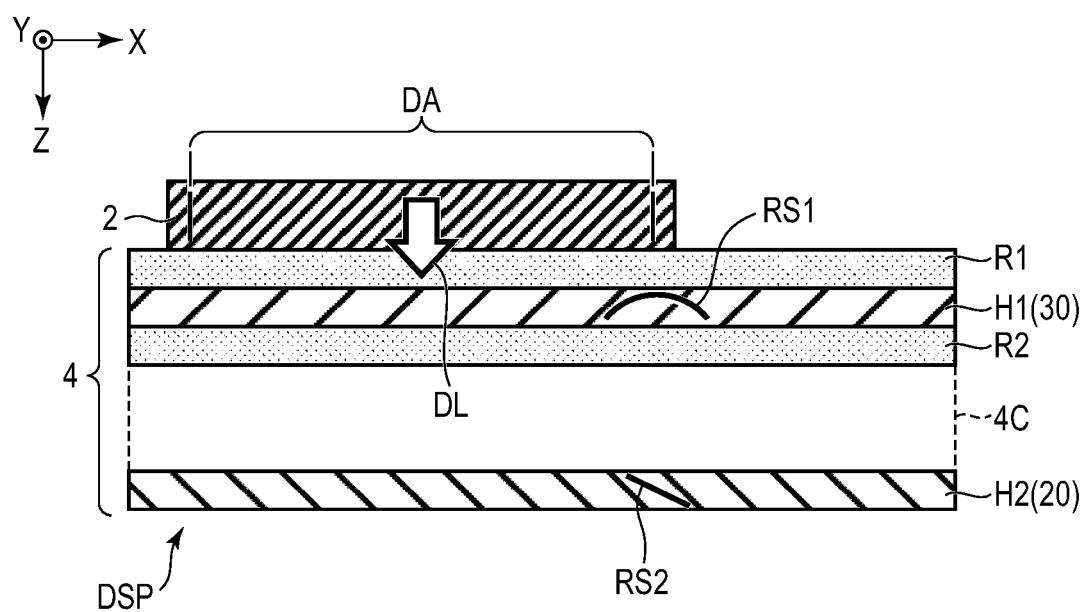
FIG. 22 is a cross-sectional view showing a sixth configuration example of the display device DSP.

FIG. 22 is a cross-sectional view showing a sixth configuration example of the display device DSP. The sixth configuration example shown in FIG. 22 is different from the first configuration example shown in FIG. 3 in that the first semi-transparent element H1 has a concave reflective plane RS1 opposed to the second semi-transparent element H2 and that the first element L1 is omitted.

The display device DSP comprises a display panel 2 and an optical system 4. Illustration of the illumination device is omitted and illustration of the details of the display panel 2 is omitted, but the display panel 2 is configured to emit the linearly polarized display light DL in the display region DA.

The optical system 4 comprises the first retardation film R1, the first semi-transparent element H1, the second retardation film R2, and the second semi-transparent element H2. Details of the first retardation film R1 and the second retardation film R2 have been described in the first configuration example, and the retardation film R1 is in contact with the display panel 2 and the first semi-transparent element H1, and the second retardation film R2 is in contact with the first semi-transparent element H1.

The first semi-transparent element H1 is arranged between the first retardation film R1 and the second retardation film R2, and comprises an optical element 30 having cholesteric liquid crystal, which will be described later in detail. The optical element 30 transmits the first circularly polarized light of the light of specific wavelengths, reflects the second circularly polarized light to the second semi-transparent element H2, and has the lens action of condensing the second circularly polarized light. The optical element 20 has a reflective plane RS1, which is simply shown in the drawing.

The second semi-transparent element H2 comprises the optical element 20 having the cholesteric liquid crystal as described in the first configuration example. The optical element 20 transmits the second circularly polarized light of the light of specific wavelengths and reflects the first circularly polarized light to the first semi-transparent element H1. The optical element 20 has a reflective plane RS2, which is simply shown in the drawing. The reflective plane RS2 has an approximately planar shape extending in a constant direction. An angle formed between the reflective plane RS2 and the X-Y plane is an acute angle clockwise from the X-Y plane. The second semi-transparent element H2 is separated from the second retardation film R2 and is opposed to the second retardation film R2 through the air layer 4C in the third direction Z.

Figure 23:
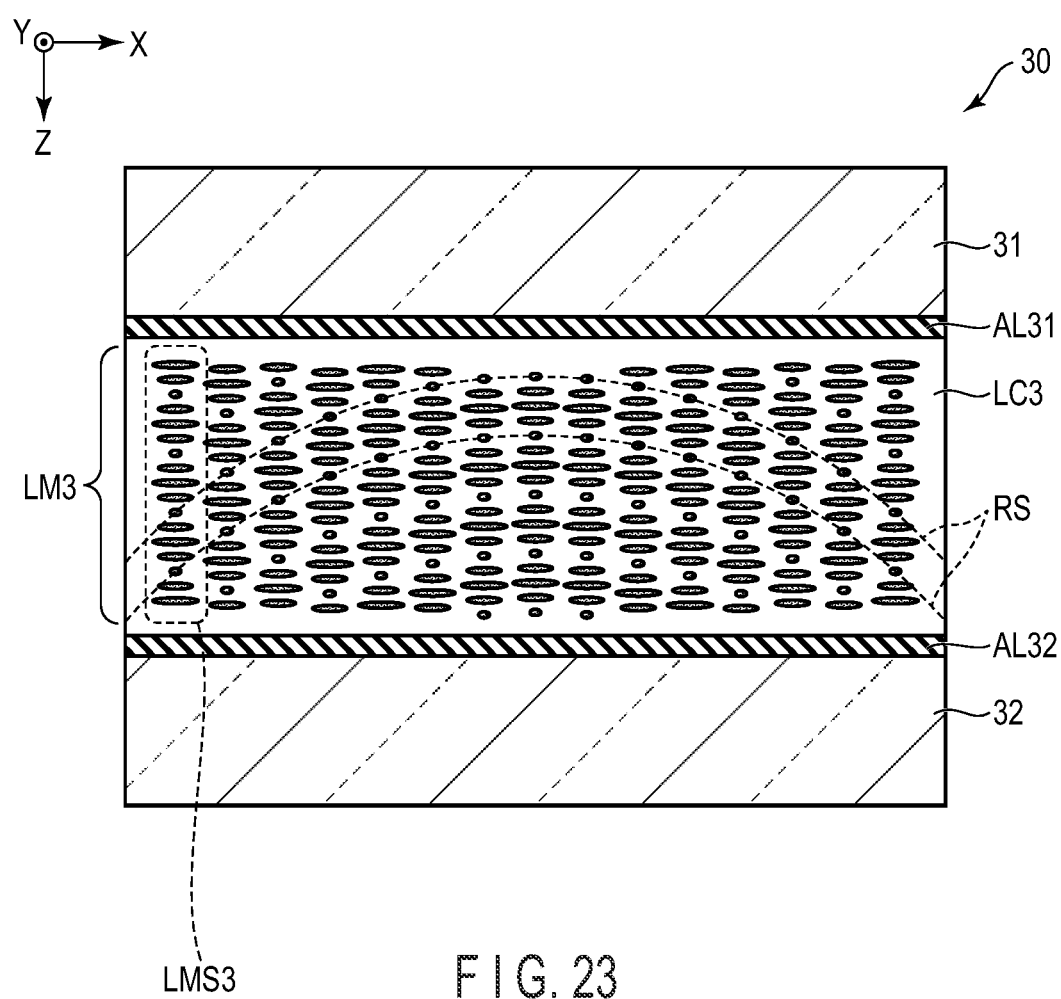
FIG. 23 is a cross-sectional view showing an example of the optical element 30 shown in FIG. 22.

FIG. 23 is a cross-sectional view showing an example of the optical element 30 shown in FIG. 22.

The optical element 30 comprises a substrate 31, an alignment film AL31, a liquid crystal layer (third liquid crystal layer) LC3, an alignment film AL32, and a substrate 32. The substrates 31 and 32 are transparent substrates that transmit light and are composed of, for example, transparent glass plates or transparent synthetic resin plates.

The alignment film AL31 is opposed to the alignment film AL32 in the third direction Z. Each of the alignment films AL31 and AL32 is, for example, a horizontal alignment film which is formed of polyimide and which has an alignment restriction force along the X-Y plane.

The liquid crystal layer LC3 is arranged between the alignment films AL31 and AL32 and is in contact with the alignment films AL3l and AL32. The liquid crystal layer LC3 has a liquid crystal structure (cholesteric liquid crystal) LMS3. To simplify the illustration, in FIG. 23, one liquid crystal molecule LM3 represents a liquid crystal molecule facing in the average alignment direction, of the plurality of liquid crystal molecules located in the X-Y plane. The plurality of liquid crystal molecules LM3 are stacked in a spiral shape in the third direction Z while turning and configures the cholesteric liquid crystal.

The liquid crystal layer LC3 has a plurality of reflective planes RS as represented by dotted lines, between the alignment films AL3l and the alignment film AL32. The reflective planes RS transmit the first circularly polarized light of the incident light and reflect the second circularly polarized light according to the Bragg's law. The reflective planes RS are curved planes, which are concave to the side opposed to the substrate 32 or the side opposed to the second semi-transparent element H2 of FIG. 22, and which are convex to the side opposed to the substrate 31 or the side opposed to the display panel 2 of FIG. 22.

Such a liquid crystal layer LC3 is cured such that the orientation direction of the plurality of liquid crystal molecules LM3 is fixed.

The optical element 30 of the first semi-transparent element H1 shown in FIG. 22 includes a liquid crystal layer LC3 including the liquid crystal structure (cholesteric liquid crystal) LMS3 shown in FIG. 23. The reflective plane RS1 in the first semi-transparent element H1 shown in FIG. 22 corresponds to the reflective planes RS in FIG. 23.

FIG. 24 is a view illustrating the optical action of the display device DSP shown in FIG. 22.

First, the display panel 2 emits the display light DL of the first linearly polarized light LP1. The display light DL is converted into the first circularly polarized light CP1 when transmitted through the first retardation film R1. The first circularly polarized light CP1 transmitted through the first retardation film R1 is transmitted through the first semi-transparent element H1 (optical element 30).

The first circularly polarized light CP1 transmitted through the first semi-transparent element H1 is transmitted through the second retardation film R2 approximately perpendicularly, and then reflected on the second semi-transparent element H2 (optical element 20). The first circularly polarized light CP1 reflected on the second semi-transparent element H2 is converted into the second circularly polarized light CP2 when obliquely transmitted through the second retardation film R2.

The second circularly polarized light CP2 transmitted through the second retardation film R2 is reflected on the first semi-transparent element H1 (optical element 30). The second circularly polarized light CP2 reflected on the first semi-transparent element H1 is transmitted through the second retardation film R2 approximately perpendicularly, then transmitted through the second semi-transparent element H2, and condensed to the user's pupil E by the lens action of the first semi-transparent element H1.

In this display device DSP, too, the same advantages as those of the first configuration example can be obtained. In addition, since the first element can be omitted, the number of components can be reduced.

The first circularly polarized light CP1 described with reference to FIG. 24 may be replaced with the second circularly polarized light CP2.

Figure 25:
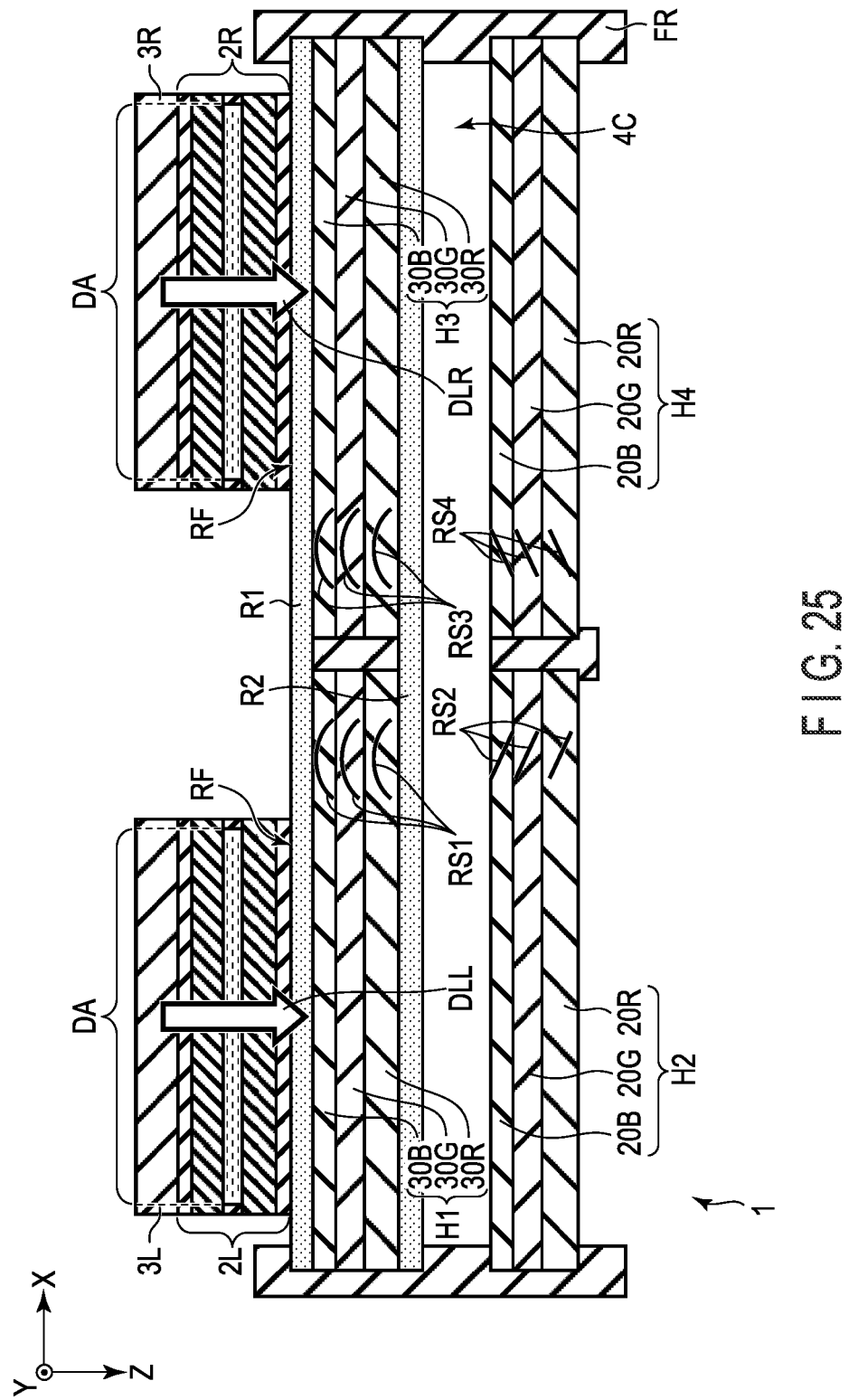
FIG. 25 is a cross-sectional view showing a sixth configuration example of the head-mounted display 1.

FIG. 25 is a cross-sectional view showing a sixth configuration example of the head-mounted display 1. The sixth configuration example shown in FIG. 25 is different from the second configuration example shown in FIG. 15 in that each of the first optical element 30B, the second optical element 30G, and the third optical element 30R configuring the first semi-transparent element H1 has a concave reflective plane RS1 and that the first optical element 30B, the second optical element 30G, and the third optical element 30R configuring the third semi-transparent device H3 has a concave reflective plane RS3.

In such a head-mounted display 1, the display light DLL of the display device DSPL is reflected on the reflective plane RS2 of the second semi-transparent element H2, then reflected on the reflective plane RS1 of the first semi-transparent element H1, and condensed on the user's left eye by the lens action of the first semi-transparent element H1. However, the display light DLL of the blue wavelength λb is reflected on the first optical element 30B of the first semi-transparent element H1 and the first optical element 20B of the second semi-transparent element H2, the display light DLL of the green wavelength λg is reflected on the second optical element 30G of the first semi-transparent element H1 and the second optical element 20G of the second semi-transparent element H2, and the display light DLL of the red wavelength λr is reflected on the third optical element 30G of the first semi-transparent element H1 and the third optical element 20R of the second semi-transparent element H2.

In addition, the display light DLR of the display device DSPR is reflected on the reflective plane RS4 of the fourth semi-transparent device H4, then reflected on the reflective plane RS3 of the third semi-transparent element H3, and condensed on the user's right eye by the lens action of the second device L2. However, the display light DLL of the blue wavelength λb is reflected on the first optical element 30B of the third semi-transparent device H3 and the first optical element 20B of the fourth semi-transparent device H4, the display light DLL of the green wavelength λg is reflected on the second optical element 30G of the third semi-transparent device H3 and the second optical element 20G of the fourth semi-transparent device H4, and the display light DLL of the red wavelength λr is reflected on the third optical element 30G of the third semi-transparent device H3 and the third optical element 20R of the fourth semi-transparent device H4.

In the sixth configuration example, too, the same advantages as those of the first configuration example can be obtained.

As described above, a display device capable of improving the efficiency of use of light can be provided according to the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of the display device which can be obtained from the configurations disclosed herein will be hereinafter added.

(1)

A display device comprising:

a display panel having a display region configured to emit display light of linearly polarized light;

a first semi-transparent element transmitting first circularly polarized light and reflecting second circularly polarized light in a reverse direction to the first circularly polarized light;

a second semi-transparent element separated from the first semi-transparent element, reflecting the first circularly polarized light, and transmitting the second circularly polarized light;

a first element opposed to the second semi-transparent element and having a lens action of condensing the second circularly polarized light;

a third semi-transparent element adjacent to the first semi-transparent element, transmitting the first circularly polarized light, and reflecting the second circularly polarized light;

a fourth semi-transparent element separated from the third semi-transparent element, being adjacent to the second semi-transparent element, reflecting the first circularly polarized light, and transmitting the second circularly polarized light;

a second element opposed to the fourth semi-transparent element and having a lens action of condensing the second circularly polarized light;

a first retardation film arranged between the display panel and the first semi-transparent element and between the display panel and the third semi-transparent element; and a second retardation film arranged between the first semi-transparent element and the third semi-transparent element, and between the second semi-transparent element and the fourth semi-transparent element, and having a refractive anisotropy in which refractive indexes of directions orthogonal to each other in a plane are substantially equivalent to each other and a refractive index in a normal is different from a refractive index in a plane.

(2)

A display device comprising:

a display panel having a display region configured to emit display light of linearly polarized light;

a first semi-transparent element transmitting first circularly polarized light and reflecting second circularly polarized light in a reverse direction to the first circularly polarized light;

a second semi-transparent element separated from the first semi-transparent element, reflecting the first circularly polarized light, and transmitting the second circularly polarized light;

a first element opposed to the second semi-transparent element and having a lens action of condensing the second circularly polarized light;

a third semi-transparent element adjacent to the first semi-transparent element, transmitting the first circularly polarized light, and reflecting the second circularly polarized light;

a fourth semi-transparent element separated from the third semi-transparent element, being adjacent to the second semi-transparent element, reflecting the first circularly polarized light, and transmitting the second circularly polarized light;

a second element opposed to the fourth semi-transparent element and having a lens action of condensing the second circularly polarized light;

a first retardation film arranged between the display panel and the first semi-transparent element and between the display panel and the third semi-transparent element; and a reflecting member arranged between the first semi-transparent element and the third semi-transparent element, and between the second semi-transparent element and the fourth semi-transparent element, and having a first reflective plane facing the first semi-transparent element and the second semi-transparent element, and a second reflective plane facing the third semi-transparent element and the fourth semi-transparent element.

(3)

A display device comprising:

a display panel having a display region configured to emit display light of linearly polarized light;

a first semi-transparent element transmitting first circularly polarized light and reflecting second circularly polarized light in a reverse direction to the first circularly polarized light;

a first retardation film arranged between the display panel and the first semi-transparent element;

a second semi-transparent element separated from the first semi-transparent element, reflecting the first circularly polarized light, and transmitting the second circularly polarized light; and a second retardation film arranged between the first semi-transparent element and the second semi-transparent element, and having a refractive anisotropy in which refractive indexes of directions orthogonal to each other in a plane are substantially equivalent to each other and a refractive index in a normal is different from a refractive index in a plane, wherein the first semi-transparent element includes a concave reflective plane opposed to the second semi-transparent element.

What is claimed is:

1. A display device comprising:
a display panel having a display region configured to emit display light of linearly polarized light;
a first semi-transparent element transmitting first circularly polarized light and reflecting second circularly polarized light in a reverse direction to the first circularly polarized light;
a first retardation film arranged between the display panel and the first semi-transparent element;
a second semi-transparent element separated from the first semi-transparent element, reflecting the first circularly polarized light, and transmitting the second circularly polarized light;
a second retardation film arranged between the first semi-transparent element and the second semi-transparent element, and having a refractive anisotropy in which refractive indexes of directions orthogonal to each other in a plane are substantially equivalent to each other and a refractive index in a normal is different from a refractive index in a plane; and
a first element opposed to the second semi-transparent element and having a lens action of condensing the second circularly polarized light.

2. The display device of claim 1, wherein
each of the first semi-transparent element and the second semi-transparent element comprises a first optical element reflecting circularly polarized light of a first wavelength,
the first optical element contains first cholesteric liquid crystal and includes a liquid crystal layer cured in a state in which alignment directions of a plurality of liquid crystal molecules are fixed,
the liquid crystal layer has a reflective plane on which the alignment directions of the liquid crystal molecules are arranged,
the reflective plane is inclined to a main surface of the liquid crystal layer, and
in the first optical element of the first semi-transparent element and the first optical element of the second semi-transparent element, the first cholesteric liquid crystals have an equivalent first helical pitch and turn counterclockwise to each other.

3. The display device of claim 2, wherein
each of the first semi-transparent element and the second semi-transparent element further comprises:
a second optical element containing second cholesteric liquid crystal and reflecting circularly polarized light of a second wavelength longer than the first wavelength; and
a third optical element containing third cholesteric liquid crystal and reflecting circularly polarized light of a third wavelength longer than the second wavelength,
the first optical element, the second optical element, and the third optical element are stacked,
the second cholesteric liquid crystal has a second helical pitch larger than the first helical pitch, and
the third cholesteric liquid crystal has a third helical pitch larger than the second helical pitch.

4. The display device of claim 3, further comprising:
an illumination device arranged on a back surface of the display panel,
wherein
the illumination device comprises a first light emitting element which emits light of the first wavelength, a second light emitting element which emits light of the second wavelength, and a third light emitting element which emits light of the third wavelength.

5. The display device of claim 4, wherein
each of the first light emitting element, the second light emitting element, and the third light emitting element is a laser light source.

6. The display device of claim 1, wherein
the display region includes a first end portion and a second end portion on a side opposite to the first end portion,
the first semi-transparent element, the second retardation film, the second semi-transparent element, and the first element have a first part extending outward from the first end portion, and a second part extending outward from the second end portion, and
a width of the first part is larger than a width of the second part.

7. The display device of claim 6, wherein
each of the first semi-transparent element and the second semi-transparent element includes a reflective plane, and
the reflective plane is inclined such that an end part on a side on which the first portion is located is separated from the display panel and an end part on a side on which the second portion is located is close to the display panel.

8. The display device of claim 1, further comprising:
a third semi-transparent element arranged between the first retardation film and the second retardation film, being adjacent to the first semi-transparent element, transmitting the first circularly polarized light, and reflecting the second circularly polarized light;
a fourth semi-transparent element separated from the second retardation film, being adjacent to the second semi-transparent element, reflecting the first circularly polarized light, and transmitting the second circularly polarized light; and
a second element opposed to the fourth semi-transparent element, being adjacent to the first element, and having a lens action of condensing the second circularly polarized light,
wherein
a reflective plane of the first semi-transparent element is different in direction from a reflective plane of the third semi-transparent element,
a reflective plane of the second semi-transparent element is different in direction from a reflective plane of the fourth semi-transparent element, and
a position where light is condensed by the first element is different from a position where light is condensed by the second element.

9. The display device of claim 8, wherein
when a boundary between the display panel and the first retardation film is referred to as a reference plane,
an angle formed between the reflective plane of the first semi-transparent element and the reference plane and an angle formed between the reflective plane of the second semi-transparent element and the reference plane are acute angles counterclockwise from the reference plane, and
an angle formed between the reflective plane of the third semi-transparent element and the reference plane and an angle formed between the reflective plane of the fourth semi-transparent element and the reference plane are acute angles clockwise from the reference plane.

10. The display device of claim 8, wherein
when a boundary between the display panel and the first retardation film is referred to as a reference plane,
an angle formed between the reflective plane of the first semi-transparent element and the reference plane and an angle formed between the reflective plane of the second semi-transparent element and the reference plane are acute angles clockwise from the reference plane, and
an angle formed between the reflective plane of the third semi-transparent element and the reference plane and an angle formed between the reflective plane of the fourth semi-transparent element and the reference plane are acute angles counterclockwise from the reference plane.

11. The display device of claim 8, wherein
when a boundary between the display panel and the first retardation film is referred to as a reference plane,
an angle formed between the reflective plane of the first semi-transparent element and the reference plane and an angle formed between the reflective plane of the fourth semi-transparent element and the reference plane are acute angles counterclockwise from the reference plane, and
an angle formed between the reflective plane of the second semi-transparent element and the reference plane and an angle formed between the reflective plane of the third semi-transparent element and the reference plane are acute angles clockwise from the reference plane.

12. The display device of claim 1, wherein
the first element has a liquid crystal layer cured in a state in which alignment directions of a plurality of liquid crystal molecules containing first liquid crystal molecules and second liquid crystal molecules are fixed,
the liquid crystal layer includes, in planar view, a first annular region where the plurality of first liquid crystal molecules are aligned in a same direction and a second annular region where the plurality of second liquid crystal molecules are aligned in a same direction outside the first annular region, and
an alignment direction of the first liquid crystal molecules is different from an alignment direction of the second liquid crystal molecules.

13. The display device of claim 12, further comprising:
an illumination device arranged on a back surface of the display panel,
wherein
the illumination device comprises a first light emitting element which emits light of a first wavelength, a second light emitting element which emits light of a second wavelength, and a third light emitting element which emits light of a third wavelength.

14. The display device of claim 13, wherein
each of the first light emitting element, the second light emitting element, and the third light emitting element is a laser light source.

* * * * *